US010886976B2

United States Patent
Rajagopal et al.

(10) Patent No.: US 10,886,976 B2
(45) Date of Patent: Jan. 5, 2021

(54) METHOD AND APPARATUS FOR FLEXIBLE FRONTHAUL PHYSICAL LAYER SPLIT FOR CLOUD RADIO ACCESS NETWORKS

(71) Applicant: MAVENIR NETWORKS, INC., Richardson, TX (US)

(72) Inventors: Sridhar Rajagopal, Plano, TX (US); Wessam Afifi Ahmed, Plano, TX (US)

(73) Assignee: MAVENIR NETWORKS, INC., Richardson, TX (US)

( * ) Notice: Subject to any disclaimer, the term of this patent is extended or adjusted under 35 U.S.C. 154(b) by 0 days.

(21) Appl. No.: 16/642,737

(22) PCT Filed: Jul. 23, 2018

(86) PCT No.: PCT/US2018/043302
§ 371 (c)(1),
(2) Date: Feb. 27, 2020

(87) PCT Pub. No.: WO2019/027711
PCT Pub. Date: Feb. 7, 2019

(65) Prior Publication Data
US 2020/0235788 A1 Jul. 23, 2020

Related U.S. Application Data

(60) Provisional application No. 62/539,195, filed on Jul. 31, 2017, provisional application No. 62/548,109, (Continued)

(51) Int. Cl.
*H04B 7/02* (2018.01)
*H04B 7/04* (2017.01)
*H04W 88/08* (2009.01)

(52) U.S. Cl.
CPC ............. *H04B 7/04* (2013.01); *H04W 88/085* (2013.01)

(58) Field of Classification Search
CPC ........ H04B 7/04; H04B 7/0848; H04B 7/024; H04B 7/0404; H04B 7/0456; H04W 88/085; H04W 24/10
(Continued)

(56) References Cited

U.S. PATENT DOCUMENTS

2015/0146565 A1   5/2015   Yu et al.
2016/0183248 A1   6/2016   Niu et al.
(Continued)

FOREIGN PATENT DOCUMENTS

WO   2017023231 A1   2/2017
WO   2017114562 A1   7/2017

OTHER PUBLICATIONS

Ali "An Overview on Interference Management in 3GPP LTE-Advanced Heterogeneous Networks", International Journal of Future Generation Communication and Networking, vol. 8, No. 1 2015 pp. 55-68.
(Continued)

*Primary Examiner* — Don N Vo
(74) *Attorney, Agent, or Firm* — Ohlandt, Greeley, Ruggiero & Perle, LLP

(57) ABSTRACT

A cloud radio access network (CRAN) system includes a baseband unit (BBU) and a radio unit (RU) remote from the BBU. The fronthaul interface between the RU and the BBU includes a radio frequency interface (RF) functionality implemented in the RU, and implementation of asymmetrical physical layer (PHY) functionality split between the BBU and RU. The asymmetrical physical layer (PHY) functionality split includes: downlink (DL) antenna port mapping and DL precoding implemented in the RU; and the split of the PHY functionality for uplink (UL) at the antenna port mapping in the BBU. For the DL, precoding and resource element (RE) mapping to frequency resources is
(Continued)

implemented in BBU, and RE mapping for antenna ports is implemented in the RU|[WA1]. The split also provides support for license-assisted access (LAA) in the CRAN system.

20 Claims, 33 Drawing Sheets

Related U.S. Application Data filed on Aug. 21, 2017, provisional application No. 62/620,221, filed on Jan. 22, 2018, provisional application No. 62/620,245, filed on Jan. 22, 2018.

(58) Field of Classification Search
USPC .......................................................... 375/267
See application file for complete search history.

(56) References Cited

U.S. PATENT DOCUMENTS

| | | | |
|---|---|---|---|
| 2018/0076914 A1* | 3/2018 | Zhou | H04L 41/0836 |
| 2018/0159611 A1* | 6/2018 | Majmundar | H04L 47/38 |
| 2019/0341970 A1 | 11/2019 | Lange | H04L 67/10 |
| 2019/0379455 A1* | 12/2019 | Wang | H03M 3/458 |
| 2020/0204248 A1* | 6/2020 | Lu | H04B 7/0413 |

OTHER PUBLICATIONS

International Search Report and Written Opinion for corresponding international application PCT/US2018/043302, 10 pages, dated Nov. 8, 2018.

* cited by examiner (Tx Diversity 1-CRS Port Ant0, 1 PRB)

(Tx Diversity 2-CRS Port Ant0, Ant1, and 1 PRB)

(Tx Diversity 4-CRS Port Ant0,1,2, 3, and 1 PRB)

Figure 22 (TM3/TM4, 3 Layers 4 Antenna Ports)

… (1)

METHOD AND APPARATUS FOR FLEXIBLE FRONTHAUL PHYSICAL LAYER SPLIT FOR CLOUD RADIO ACCESS NETWORKS

BACKGROUND OF THE DISCLOSURE

1. Field of the Disclosure

The present disclosure relates to systems and methods for radio access networks (RAN), and relates more particularly to RANs for $4^{th}$-Generation (4G) and $5^{th}$-Generation (5G) based mobile networks.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the eNodeB or eNB). In addition, conventional RANs use application specific hardware for processing, which make the conventional RANs difficult to upgrade and evolve. As future networks evolve to have massive densification of networks to support increased capacity requirements, there is a growing need to reduce the capital and operating costs of RAN deployment and make the solution scalable and easy to upgrade.

SUMMARY OF THE DISCLOSURE

Cloud-based Radio Access Networks (CRANs) are networks where a significant portion of the RAN layer processing is performed at a central unit, also known as the baseband unit (BBU), located in the cloud on commercial off the shelf servers, while the radio frequency (RF) and real-time critical functions can be processed in the remote radio unit (RRU), also referred to as the radio unit (RU). In some cases, the BBU is split into two parts: centralized unit (CU) and distributed unit (DU), where the DU is located more towards the edge of the network. The BBU may also be virtualized, in which case it is also known as vBBU.

For the RU and DU to communicate, an interface called the fronthaul is provided. However, there are various aspects which must be considered for the fronthaul interface design since the splitting of the RAN functions into the RU and the BBU impacts the transport latency and bandwidth requirements. In addition, there are many different features in RAN that need to be supported. For these reasons, the choice of the split of the RAN functions and the communication interface aspects need to be carefully designed.

The present disclosure provides example embodiments of a physical layer functional split between the BBU and the RUs that i) maximizes the efficiency of the transport and ii) allows the flexibility to support many of the features required for virtualization and commercialization of the CRAN technology.

Some of the benefits of the CRAN technology in comparison to traditional Long Term Evolution (LTE) networks technology are summarized here. CRAN provides flexibility to the Mobile network operators (MNOs) to be able to optimize system performance in real-time by varying various configuration and system parameters using the cloud-based infrastructure. As new wireless technologies and standards appear, MNOs are required to upgrade their eNB small cells, which upgrade usually involves high costs. Using the CRAN, most of the LTE functionalities in the BBU can be software-based, which means the functionalities can be easily upgraded with reduced costs when new wireless technologies appear. In addition, a software-based BBU in the cloud provides other benefits, e.g., flexibility in adding new services, and a significant reduction in operation and management (OAM) costs.

To enable the CRAN technology solution, the LTE/$5^{th}$-Generation New Radio (5G-NR) functionalities need to be split between the BBU in the cloud and the RRU onsite. $3^{rd}$ Generation Partnership Project (3GPP) has defined 8 options for the split between the BBU and the RRU among different layers of the protocol stack. However, the 8 split options according to 3GPP are described only as high-level ideas, e.g., split is defined between layers and is common among all data and control channels, as well as physical signals. Furthermore, the implementation details or the differentiation for some of the crucial features such as multiple-input multiple-output (MIMO), transmit diversity, live migration, carrier-aggregation (CA), licensed-assisted access (LAA), etc., are not described yet.

In accordance with the present disclosure, combinations of splits are also possible, i.e., multiple splits can be provided within the same CRAN. This gives rise to a mid-haul split as shown in FIG. 2, in which 2 splits are used at the same time. The fronthaul split can be defined between the DU and a transmit receive point (TRP) or the RU. In the present disclosure, the fronthaul split can be considered as i) a split between the DU and the TRP, e.g., as shown in FIG. 2, or ii) a split between the BBU and the RRU (or RU or TRP), and these terms are used interchangeably (e.g., BBU and DU as one group; TRP, RRU and RU as a second group) in the present disclosure in the context of describing the fronthaul split.

There are multiple factors which influence the selection of the fronthaul split option:

Bandwidth: Different split options have different bandwidth requirements, which play a crucial role in determining the fronthaul design. As an example, option 8 (PHY-RF split) has very high requirements on the fronthaul bandwidth, which may imply higher resource consumption and costs in transport dimensioning (link capacity, equipment, etc.). On the other hand, one of the benefits of option 5 (intra-MAC split) is that it reduces the bandwidth needed on fronthaul.

Latency: The point in the LTE/5G-NR protocol stack where the split between the BBU and the RRU is implemented affects the latency. For example, splitting between layer 3 (L3) and layer 2 (L2) in option 1 has very low latency requirements, and this split option 1 is useful in handling some edge computing or low latency use cases in which the user data needs to be located close to the transmission point. Another example is split option 3 within the radio link control (RLC) layer. The split in option 3-1, i.e., having the automatic repeat request (ARQ) in the BBU, is more latency sensitive than the split with ARQ in RU, since re-transmissions are susceptible to transport network latency over a split transport network. On the other hand, option 3-2 is insensitive to the transmission network latency between the BBU and the RU. In the split option 5, i.e., intra-MAC split, time-critical functions are present in the Low-MAC sublayer which includes the functions with stringent delay requirements, e.g., hybrid automatic repeat request (HARM), or the functions where performance is proportional to latency, e.g., radio channel and signal measurements from PHY, random access control. This split reduces the delay requirements on the fronthaul interface. On the other hand, option 8 has very high requirements on fronthaul latency, which may cause constraints on network deployments with respect to network topology and available transport options.

Implementation Cost: Higher level splits on the protocol stack usually have high implementation costs compared to lower splits since lower splits allow for more virtualization. As an example, in split option 8, separation of RF and PHY allows pooling of PHY resources, which may enable a more cost-efficient dimensioning of the PHY layer. Separation of RF and PHY allows operators to share RF components, which may reduce system and site costs. On the other hand, high requirements on fronthaul bandwidth with lower splits implies higher resource consumption and costs in transport dimensioning (link capacity, equipment, etc.).

Other factors which influence the selection of the fronthaul split option include virtualization benefits, complexity of the fronthaul interface, expansion flexibility, computing power, and memory requirement.

Although the present disclosure presents the split option 7 (i.e., Intra-PHY split) as an example embodiment for the purposes of illustrating detailed aspects, the present disclosure is not limited to the split option 7 example, and the present disclosure is intended to encompass other split options mentioned above.

Existing CRAN solutions do not consider many of the new features mentioned below in the design of the fronthaul interface between the upper physical layer (UPHY) and the lower physical layer (LPHY) in the split option 7. In the present disclosure, various methods and implementations for the fronthaul interface are provided to balance the tradeoff between virtualization and system efficiency, e.g., fronthaul bandwidth, latency, cost, complexity, etc., and to consider features such as Licensed-assisted access (LAA), which is described in further detail in this disclosure, live migration, MIMO, etc.

LAA refers to carrier aggregation (CA) with at least one secondary cell (SCell) operating in the unlicensed spectrum. In LAA, the configured set of serving cells for a UE therefore always includes at least one SCell operating in the unlicensed spectrum according to frame structure Type 3, also called LAA SCell. While LAA support over the fronthaul interface is one example aspect of the implementation described in the present disclosure, the present disclosure is not limited to the LAA-focused example, and the present disclosure is also applicable to other unlicensed spectrum technologies such as LTE-unlicensed (LTE-U), Multefire, Citizens Broadband Radio Service (CBRS), etc. Some of the LAA Functionalities that are relevant to the fronthaul split implementation of the present disclosure are briefly discussed in this disclosure.

Listen-before-talk (LBT): The LBT procedure is defined as a mechanism by which an equipment applies a clear channel assessment (CCA) check before using the channel. The CCA utilizes at least energy detection to determine the presence or absence of other signals on a channel to determine whether a channel is occupied or clear. For example, current European and Japanese regulations mandate the usage of LBT in the unlicensed bands. Apart from regulatory requirements, carrier sensing via LBT is one way to implement a fair sharing of the unlicensed spectrum in a single global solution framework.

Discontinuous transmission on a carrier with limited maximum transmission duration: In the unlicensed spectrum, channel availability cannot always be guaranteed. In addition, certain regions such as Europe and Japan prohibit continuous transmission and impose limits on the maximum duration of a transmission burst in the unlicensed spectrum. Therefore, discontinuous transmission with limited maximum transmission duration is a required functionality for LAA.

Dynamic frequency selection for radar avoidance in certain bands/regions: Dynamic frequency selection (DFS) is a regulatory requirement for some frequency bands, e.g., to detect interference from radar systems and to avoid co-channel operation with these systems by selecting a different carrier on a relatively slow time scale.

Carrier selection: Given a large available bandwidth of unlicensed spectrum, carrier selection is required for LAA nodes to select the carriers with low interference and thereby achieve good co-existence with other unlicensed spectrum deployments.

Discovery Reference Signal (DRS): The DRS was introduced in 3GPP Release 12 to support small-cell on/off where secondary component carriers (CCs) can be turned off except for periodic transmission of DRS. DRS is used by the device to perform mobility measurements and to maintain synchronization. The signals comprising the DRS include the primary synchronization signal (PSS), secondary synchronization signal (SSS), cell-specific reference signal (CRS) and optionally the channel state information reference signal (CSI-RS). The UE is configured with a discovery measurement timing configuration (DMTC), which is a time window within which the UE can expect the DRS to be received. While the DRS occasion may occur anywhere in the DMTC, the UE may expect the DRS to be transmitted from a given cell so that the duration between successive DRS transmissions is fixed, e.g., 40, 80 or 160 ms. The use of the 3GPP Release 12 DRS on a carrier in the unlicensed spectrum may have some new constraints. DRS are used also in LAA (preceded by CCA) and are the basis for radio-resource management including cell identification.

There are multiple ways in which the PHY can be split for the fronthaul split option 7, and each option has a different impact on virtualization and on the transport interface requirements for latency and throughput. The PHY split can be asymmetric, i.e., the split location can be different for DL and UL processing. While the DL PHY processing is defined by the 3GPP specification, the UL PHY can have many architecture variants, and even different types of channels, e.g., control channel, data channel, reference signal channel, can have different splits. There are various PHY features that impact the PHY architecture, such as MIMO, diversity modes, CA, LAA, narrowband Internet of Things (NB-IoT), etc. In addition, commercial deployment aspects that impact RU inter-operability/performance should be considered, e.g., network listen, LAA, live migration support for pooling resources in BBU, RU configuration/OAM, etc.

The example embodiments according to the present disclosure take into consideration several configuration goals for optimizing the fronthaul functional split (also referred to as the "split"). The example split aims to minimize the impact on transport interface while maximizing the amount of processing in the BBU for virtualization. The example split aims to facilitate implementation of low cost RUs for massive densification. The example split aims to prevent system performance loss in terms of throughput or latency compared to an integrated solution with an ideal fronthaul interface. In this regard, the example split can provide performance gains due to joint processing and interference management across DUs in the cloud. The example split takes into consideration both $4^{th}$-Generation (4G) and $5^{th}$-Generation (5G) systems such that there is no re-design required for new radio (NR). The example split aims to allow scaling of transport requirements with user data traffic and bandwidth, and not have a fixed rate for the transport. The example split aims to not limit any receiver architectures that vendors may choose for performance enhancements (some of which may be required for 5G).

The present disclosure provides an example embodiment of a cloud radio access network (CRAN) system which includes a baseband unit (BBU) and a radio unit (RU) remote from the BBU, which BBU has a centralized unit (CU) and a distributed unit (DU), which CU and DU can be co-located, but need not be co-located. The fronthaul interface between the RU and the BBU includes a radio frequency interface (RF) functionality implemented in the RU, and implementation of asymmetric split for downlink and uplink at physical layer (PHY) functionality split between the BBU and RU. The asymmetric split for downlink and uplink includes: downlink (DL) antenna port mapping and DL precoding implemented in the RU; and uplink (UL) antenna port mapping implemented in the BBU.

The present disclosure provides an example embodiment of the CRAN system in which, for the DL, precoding and resource element (RE) mapping to time and frequency resources is implemented in BBU, and RE mapping for antenna ports is implemented in the RU.

The present disclosure provides an example embodiment of the CRAN system in which, during precoding, cell-specific reference signal (CRS) is logically separated from physical downlink shared channel (PDSCH) resources in a physical resource block (PRB), e.g., by applying a masking function.

The present disclosure provides an example embodiment of the CRAN system in which a specific precoding type is indicated to the RU, the specific precoding type being defined by at least one of a codebook index, number of layers and a type of transmission scheme.

The present disclosure provides an example embodiment of the CRAN system in which, for efficient transmission on the fronthaul interface, resource elements for cell-specific reference signals (CRS) from multiple antennas are multiplexed within a data transmission for a single physical resource block (PRB) in the case number of layers is less than number of transmit antennas.

The present disclosure provides an example method of providing a fronthaul interface in the CRAN system, which method includes: providing radio frequency interface (RF) functionality in the RU; and providing physical layer (PHY) functionality split between the BBU and the RU, including: i) downlink (DL) antenna port mapping and DL precoding implemented in the RU; and ii) the split of the PHY functionality for uplink (UL) at the antenna port mapping.

The present disclosure provides an example method of providing a fronthaul interface in the CRAN system, which method includes dynamically adapting uplink (UL) bitwidths on the fronthaul interface based on modulation and coding scheme (MCS) and signal-to-interference-plus-noise ratio (SINR) of a transmission from a user equipment (UE) to provide transport efficiency increase; and transmitting only tones having valid data over the fronthaul interface.

The present disclosure provides an example method of providing a fronthaul interface in a cloud radio access network (CRAN) having a baseband unit (BBU) and at least one radio unit (RU) remote from the BBU, the BBU having a centralized unit (CU) and a distributed unit (DU), which method includes: providing radio frequency interface (RF) functionality in the RU; and providing physical layer (PHY) functionality split between the BBU and the RU, including: i) listen-before-talk (LBT), unlicensed channels scanning, and reservation signals generation implemented in the RU; and ii) management of LBT, carrier-selection, and dynamic frequency selection, and DRS generation implement in the BBU.

The present disclosure provides an example method of providing a fronthaul interface in the CRAN system for unlicensed spectrum operation, which method includes: a) configuring the RU, by the BBU via the fronthaul interface, with configuration parameters including at least one of energy detection threshold, target frequency band and scanning period, for carrier-selection; b) scanning, by the RU, multiple unlicensed channels based on the configuration parameters; c) sending, by the RU via the UL fronthaul interface, performance metrics including at least one of occupancy ratio and average received signal strength indicator (RSSI); and d) selecting, by the BBU, optimal channel to use for transmission of data based on the performance metrics received via the UL fronthaul interface. The method may optionally further include: e) sending, by the BBU, a configuration message in the DL to the BBU with the selected channel for transmission of data; and f) acknowledging, by the RU, the configuration message, and initiating data transmission by the RU.

The present disclosure provides an example method of providing a fronthaul interface in the CRAN system for unlicensed spectrum operation, which method includes: a) configuring the RU, by the BBU via the fronthaul interface, with configuration parameters including at least one of discovery measurement timing configuration (DMTC) period and DMTC offset, for transmission of a discovery signal including at least one of discovery reference signal (DRS) and LTE-unlicensed discovery signal (LDS); b) configuring the RU, by the BBU, with listen-before-talk (LBT) parameters required for each transmission; c) reporting, by the RU, an LBT outcome to the BBU; and d) caching, by the RU, a local copy of the discovery signal configuration for discovery signal transmission in case the BBU is disconnected.

The present disclosure provides an example method of providing a fronthaul interface in the CRAN system for unlicensed spectrum operation, which method includes: a) continuously scanning, by the RU, unlicensed channels in a configured frequency band, and sending at least one RU measurement report to the BBU; b) reporting to layer 2 (L2) in the BBU, by the RU, the number of listen-before-talk (LBT) failures for at least one of discovery reference signal (DRS), LTE-unlicensed discovery signal (LDS), and data transmission; c) determining, by the BBU, based on the reported L2 LBT failures and the RU measurements report, whether a reconfiguration of the RU with a new unlicensed channel for data transmission is needed; and d) if a reconfiguration of the RU is determined to be needed, reconfiguring the RU, by the BBU, with a new unlicensed channel for data transmission.

The present disclosure provides an example method of providing a fronthaul interface in the CRAN system, which method is for adapting reference signal generation and transmission in the CRAN, and which method includes: a) continuously generating and transmitting, by the BBU, reference signals to the RU via the fronthaul interface; b) storing, by the RU, a local copy of the newest reference signal received from the BBU, wherein the previously stored reference signal is overwritten by the newest reference signal received from the BBU; c) transmitting over the air, by the RU, the newest reference signal received from the BBU; and d) in the case connection is lost between the RU and BBU, transmitting over the air, by the RU, the saved copy of the reference signal.

The present disclosure provides an example method of providing a fronthaul interface in the CRAN system, which method is for adapting reference signal transmission from the BBU to the RU based on fronthaul bit rate, which method includes: a) for a fronthaul bit rate above a predefined threshold: i) transmitting a control signal from the BBU to the RU to start using a local copy of a reference signal stored at the RU; and ii) using, by the RU, the stored local copy of the reference signal for transmission over the air; b) for a fronthaul bit rate above the predefined threshold: i) using a timer at the RU to check for a reference signal from the BBU within a predefined time period; and ii) once the predefined time period has elapsed, using, by the RU, the latest local copy of the reference signal; and c) for a fronthaul bit rate below the predefined threshold: i) sending a control signal from the BBU to the RU to start live reception of the reference signals from the BBU; and ii) performing, by the RU, live reception of the reference signals from the BBU.

The present disclosure provides an example method of providing a fronthaul interface in the CRAN system, which method is for adapting reference signal transmission from the BBU to the RU based on fronthaul latency, which method includes: a) for fronthaul latency larger than a predefined threshold, using, by the RU, a local copy of the reference signal to be transmitted over the air; b) for fronthaul latency smaller than the predefined threshold, continuously sending, by the BBU, the reference signals to the RU; and c) at least one of enabling and disabling of reference signal transmission from the BBU by using at least one control message exchanged between the RU and the BBU.

The present disclosure provides an example method of providing a fronthaul interface in the CRAN system, which method is for adapting compression and decompression techniques at the BBU and the RU based on at least one of: a) fronthaul bit rate, whereby fronthaul overhead is reduced; b) processing latency of at least one of compression and decompression, wherein, for low latency application, at least one of a selected compression technique and a selected decompression technique is omitted to reduce processing time; and c) at least one of fronthaul conditions and applications requirements, whereby multiple control messages are exchanged between the BBU and RU to selectively enable and disable at least one compression technique in an adaptive fashion based on the at least one of fronthaul conditions and applications requirements.

The present disclosure provides an example method of providing a fronthaul interface in the CRAN system, which method is for supporting live migration on the BBU, which method includes: generating, by the at least one RU, at least one reference signal to keep at least one cell connection alive while the BBU is performing resource migration.

The present disclosure provides an example method of providing a fronthaul interface in the CRAN system, which method is for dynamic compression for the fronthaul interface, which method includes: performing tone selection for active tones; and performing bit-width quantization adaptation.

The present disclosure provides an example apparatus for configuring at least one distributed unit (DU) of a baseband unit (BBU) in a cloud radio access network (CRAN), the CRAN additionally having at least one radio unit (RU) remote from the BBU, the BBU having the at least one DU and a centralized unit (CU), which example apparatus includes: a fronthaul interface between the BBU and the DU for data transfer; a network configuration protocol (Net-Conf) interface for alarms, events, key performance indicators (KPIs) and configuration of the DU; and a representational state transfer application programming interface (REST API) for lifecycle management of the DU.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following detailed description, which is to be read in association with the accompanying drawings.

FIG. 22 illustrates an example of TM3/TM4 with 3 Layers and 4 Antenna Ports.

DETAILED DESCRIPTION OF THE EMBODIMENTS

In an example embodiment of the present disclosure, asymmetrical fronthaul splits are provided for the DL and UL to balance the tradeoff between fronthaul bandwidth, efficiency, and virtualization benefits while considering the following:
 a. Various use cases and features such as LAA, CA, IoT, Massive MIMO, Live migration, SON, TDD, FDD, etc.
 b. Receive diversity (single input, multiple output (SIMO)): Send one stream to BBU—All the diversity antenna processing must be done at the RRU.
 c. UL MIMO: Send two streams to BBU×e.g., 2×2 MIMO, need to send different streams to the BBU.
 d. Split adaptation based on channel type, e.g., data channels vs. control channels such as physical uplink control channel (PUCCH), physical downlink control channel (PDCCH), etc.
 e. Random Access Channel (RACH): send time-domain vs. frequency-domain samples.
 f. Operation and Management (OAM), e.g., authentication, RRU attach, configuration parameters, etc.
 g. Moving the reference signals to the RRU to support live migration and LAA.
 h. Method to maintain UE network connectivity in case BBU goes off
 i. Changes in the fronthaul interface to enable LAA over CRAN.

Figure 1:
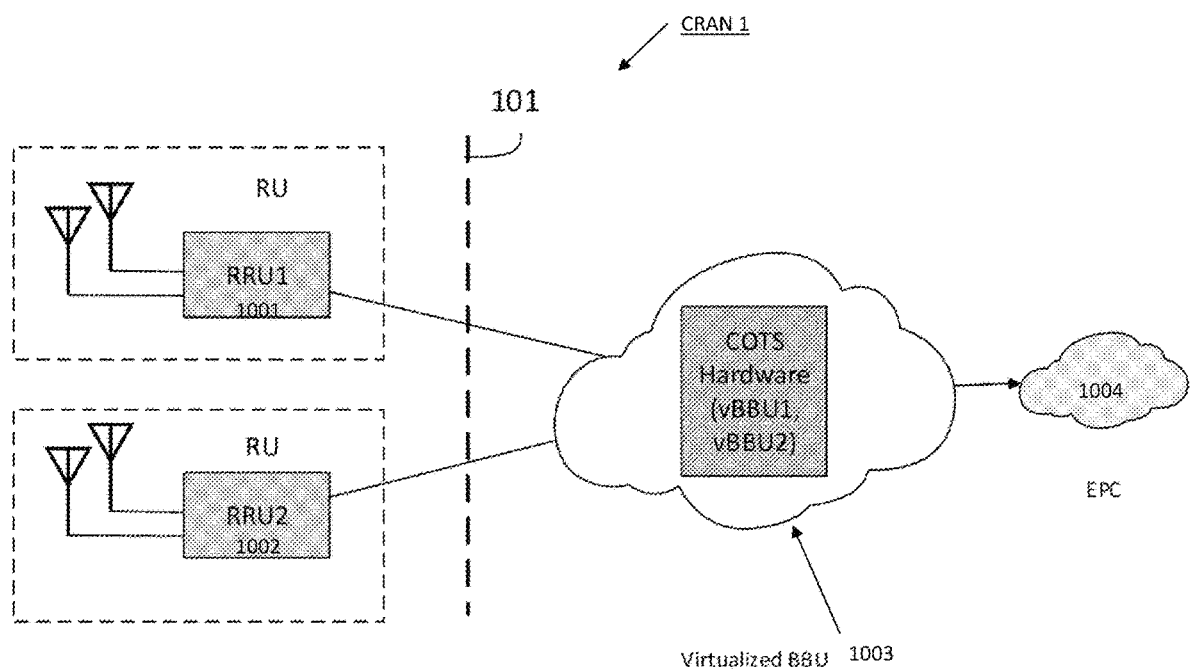
FIG. 1 illustrates an example of a CRAN system architecture and a functional split with a vBBU and one or more RRUs.

FIG. 1 illustrates an example of a functional split for CRAN 1 with the virtualized baseband unit (vBBU) 1003 and RUs 1001 and 1002. The dotted line 101 represents the fronthaul split point. The vBBU is connected to the evolved packet core (EPC) 1004 via the backhaul interface and is connected to the RU(s) via the fronthaul interface. Data and control signals are communicated between the vBBU and the RUs in both directions (upstream and downstream). Different versions of the RUs, connected to the vBBU, can be made available depending on the RU category types, e.g., depending on what the RU can and cannot support, and the vBBU is responsible for supporting different RU categories.

Figure 2B:
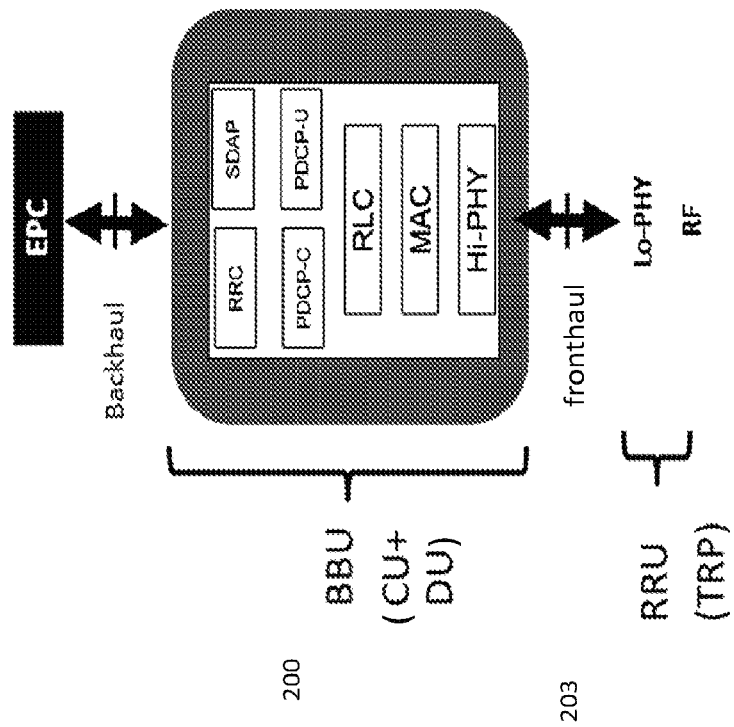
FIGS. 2A and 2B illustrate combinations of different functional splits.
Figure 2A:
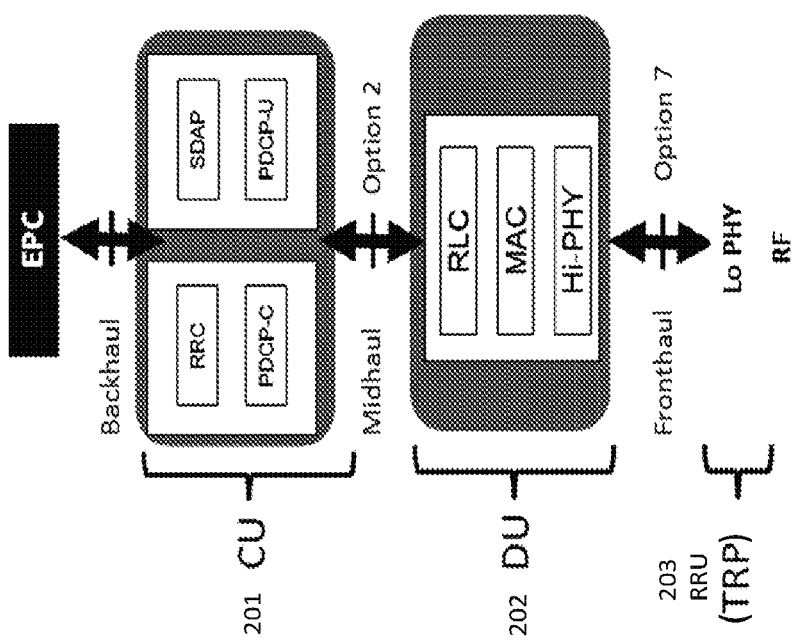

FIGS. 2A and 2B illustrate examples of different functional splits. FIG. 2A illustrates an example embodiment of splitting the CRAN into CU 201, DU 202, and RRU 203 (or TRP). FIG. 2B illustrates an example embodiment in which the CU 201 and DU 202 are combined into one block, i.e., BBU 200, which is connected to the RRU 203 (or TRP) via the fronthaul interface. In the example embodiment of FIG. 2A in which the CU 201 and DU 202 are split, the CU 201 can include the radio resource control (RRC) (layer 3), packet data convergence protocol (PDCP) (part of layer 2) components (PDCP-C for control and PDCP-U for user data are shown), while the DU 202 can consist of the radio link control (RLC), media access control (MAC), and scheduler (not shown) (part of layer 2) as well as the higher PHY (Hi-PHY, also referred to as U-PHY) (part of layer 1). The RRU 203 (or TRP) can consist of lower PHY (LPHY) and the RF.

Figure 3:
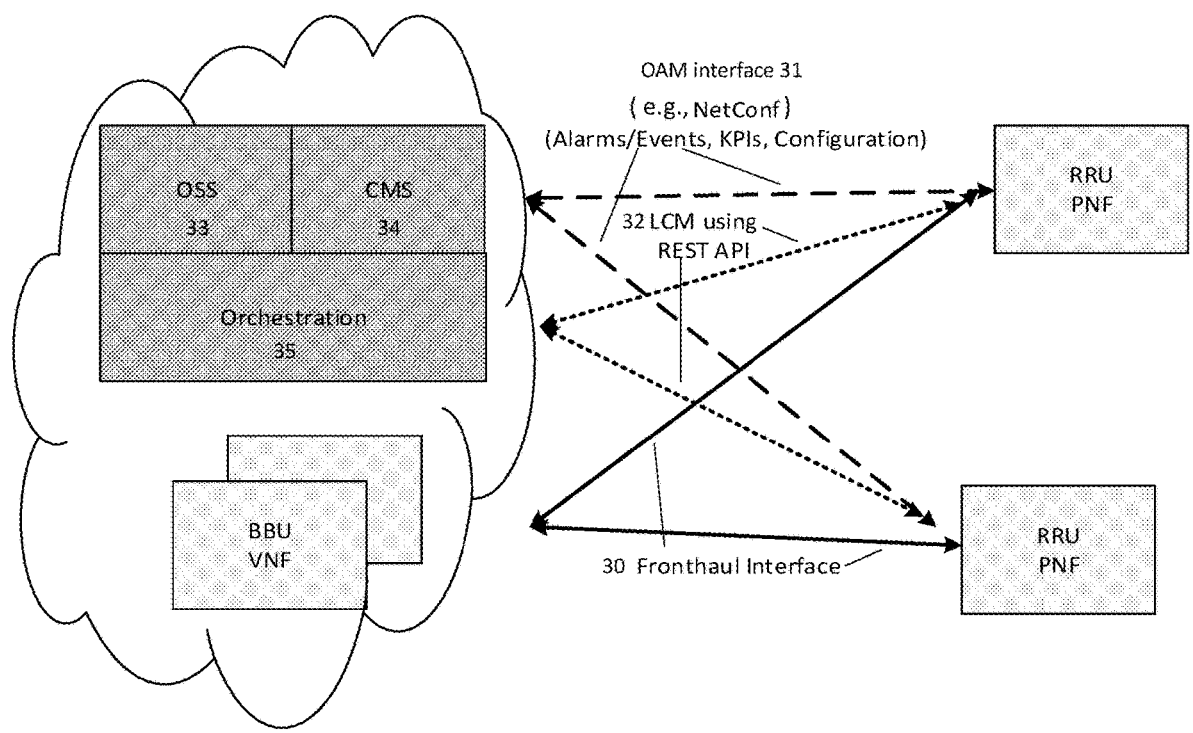
FIG. 3 illustrates various logical interfaces between the BBU and the RRUs.

FIG. 3 illustrates an embodiment of the invention in which three logical interfaces are provided: the fronthaul interface 30 used for data communication; a logical interface 31 for the operation and management (OAM); and a logical interface 32 for the lifecycle management (LCM) of the RRU physical network function (PNF). The lifecycle management includes, e.g., instantiation, termination, resource pooling, monitoring and updating of the processes running on the BBU and RRU. A cloud-based management system, which includes operator service system 33 (OSS) and centralized management system 34 (CMS), manages one or more BBU virtual network function (VNF) and the RRU PNFs. Also provided is an orchestration entity 35 used for virtualization functionality, provisioning and lifecycle management of the VNF and the PNF. As an example of the logical interface 31, network configuration protocol (NetConf) interface is used to support alarms/events, key performance indicators (KPIs) and configuration of the RRU. A data model for the interface is based on Technical Report 196 (TR-196) of the consortium Broadband Forum, and the YANG language can be used for defining the data model used for configuration of the RRU. REST API is used for supporting the lifecycle management of the RRU and is supported by the orchestration layer in the BBU. The RAN functionality is implemented as BBU VNFs on the BBU.

Figure 4A:
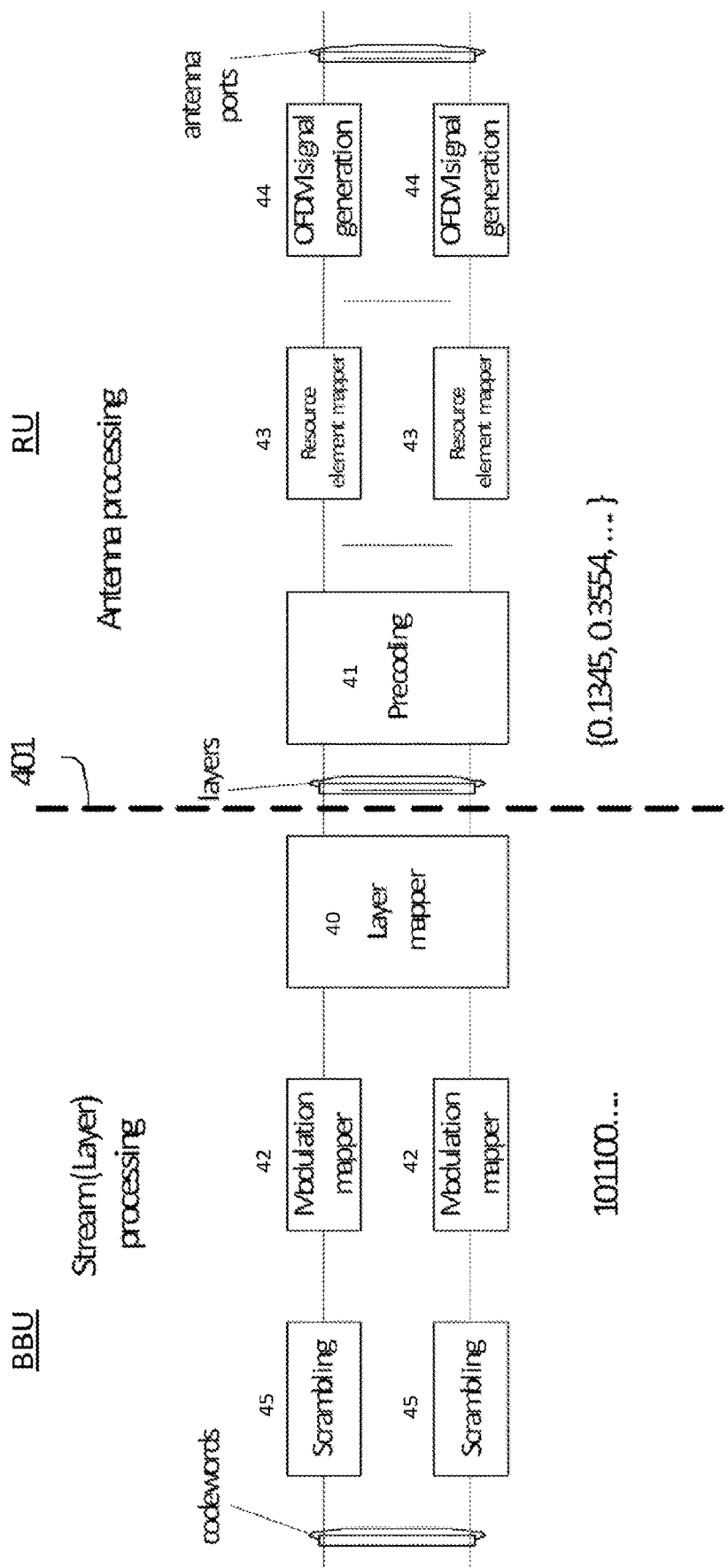
FIG. 4A illustrates an example functional split for the DL processing chain.

FIG. 4A illustrates an example embodiment of the present disclosure, in which the data channel split and control channel split are provided for the downlink (DL) between the RU and the BBU, i.e., the functional split 401 for the two channels is provided at the interface of the layer mapping (represented by the function block layer mapper 40) and the precoding block 41. This is also referred to as split option 7-2. Also shown in FIG. 4A are the following blocks: scrambling blocks 45, modulation mapper blocks 42, resource element mapper blocks 43, and orthogonal frequency division multiplexing (OFDM) signal generation blocks 44.

In the example embodiment shown in FIG. 4A, precoding can be different for control vs. data channels, and the precoding weights can be generated at the BBU. At the interface between layer mapping and precoding, there is a significant transport expansion since the precoding block 41 converts the bit processing into floating point processing. It should be noted that the bit-to-floating-point conversion process is moved from the modulation mapper 42, before the interface, to the precoding block 41, after the interface, to reduce the fronthaul bandwidth. Furthermore, at the interface between layer mapping and precoding, the number of streams (layers) get converted into number of antennas. As 5G technology adoption accelerates, the number of antennas is expected to exceed the number of streams. The configuration of precoding block 41 and OFDM block 44 can be done dynamically based on the NR/LTE numerology.

Figure 4B:
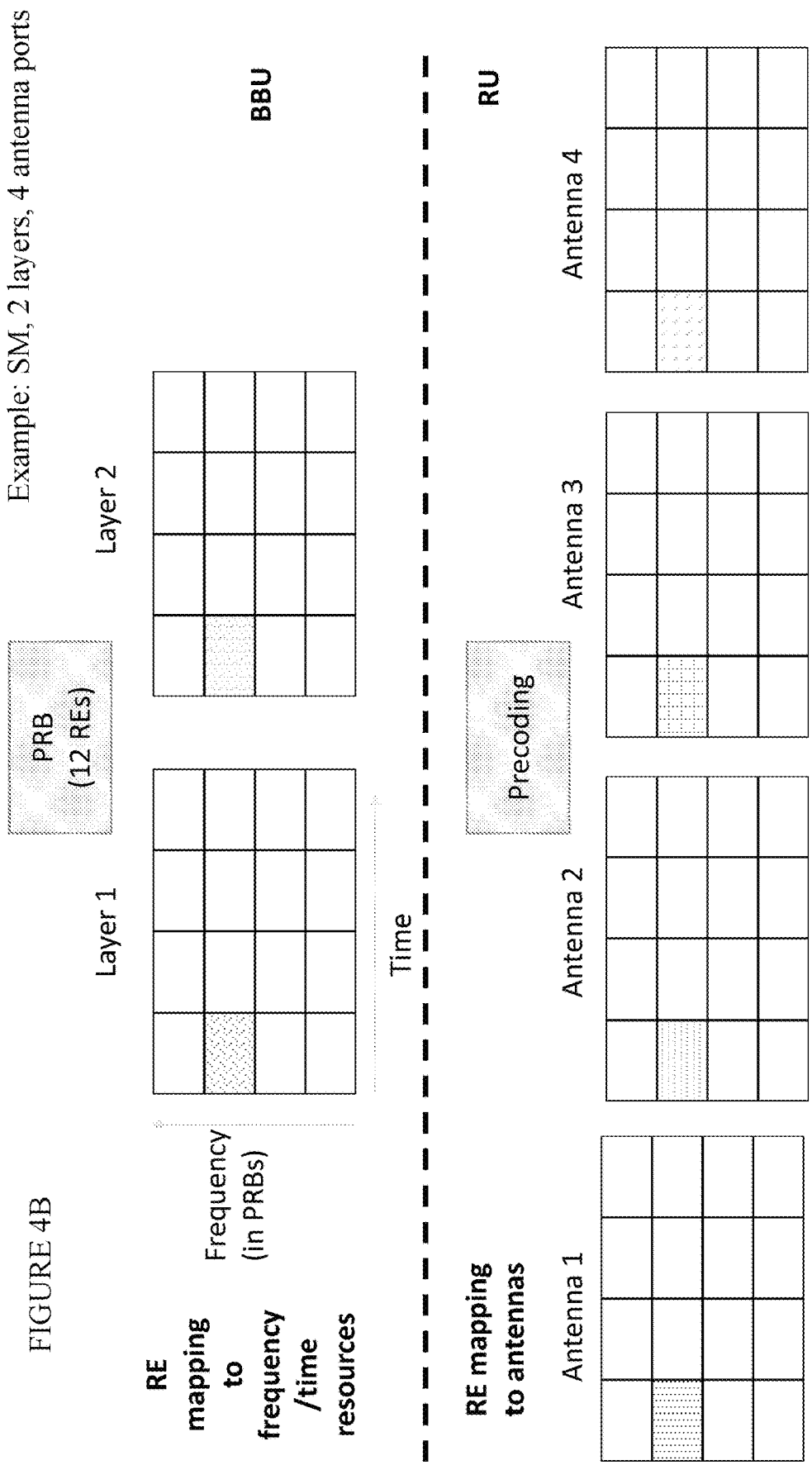
FIG. 4B illustrates the RE mapping process between the BBU and RU for the DL processing chain.
Figure 16:
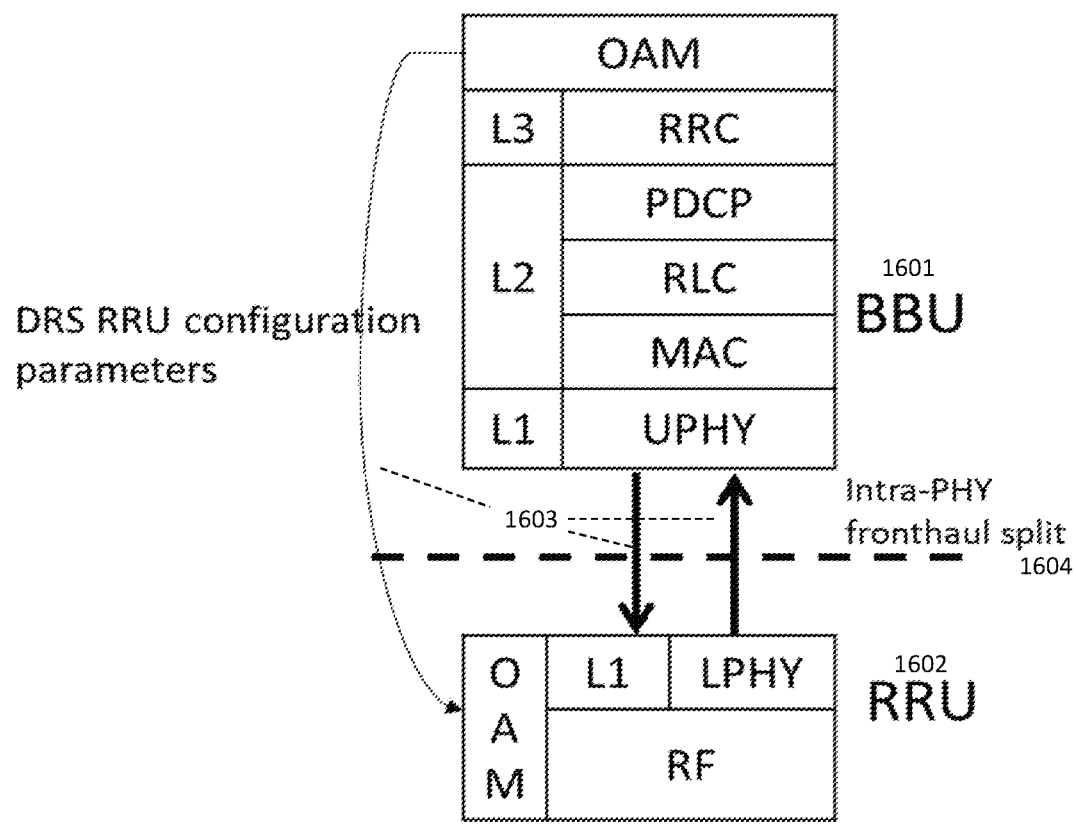
FIG. 16 illustrates an example of DRS configuration parameters transmission from the BBU to the RRU.

In another example embodiment shown in FIG. 4B, resource element (RE) mapping operation can be separated into two parts for precoding support at RU for transmit diversity and spatial multiplexing (SM) modes: RE mapping for frequency resources can be performed at the BBU; and RE mapping to antenna ports can be performed at the RU after precoding. As shown in FIG. 4B, at the BBU, RE mapping for frequency/time resources is performed for different layers after the layer mapping block. The second part of RE mapping is executed at the RU, where RE mapping to antenna ports is performed after the precoding block. FIG. 4B shows an example for spatial multiplexing (SM) where the number of layers is two and the number of antenna ports is four. In FIG. 4B, 16 physical resource blocks (PRBs) are shown, with each PRB having 12 resource elements (REs) (not shown).

Figure 5:
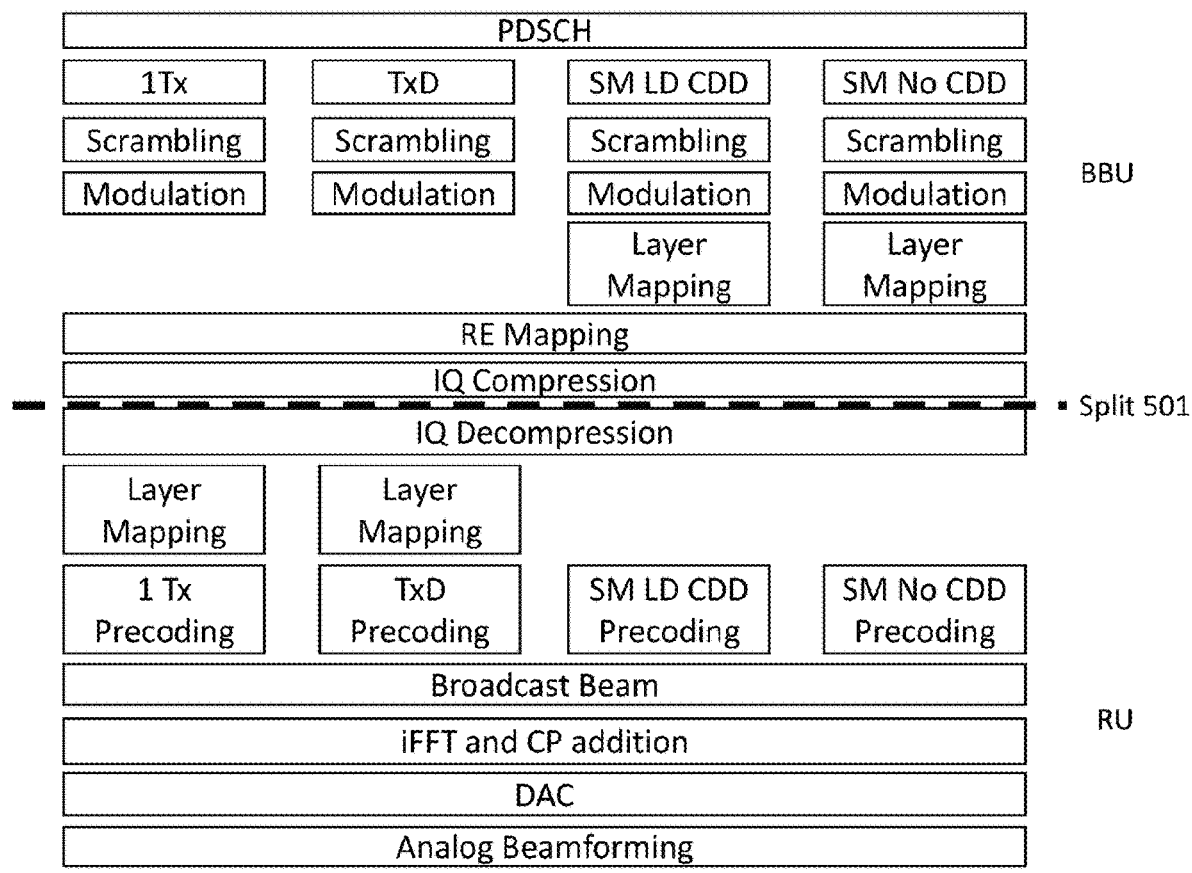
FIG. 5 illustrates another example functional split for the DL processing chain with precoding at the RU.

FIG. 5 illustrates another example embodiment of a functional split 501 for the DL control and data channels as well as DL reference signals. Various function blocks shown in FIG. 5 contain descriptive legends which are self-explanatory when read in conjunction with the Glossary of Terms provided in the present disclosure.

Figure 6:
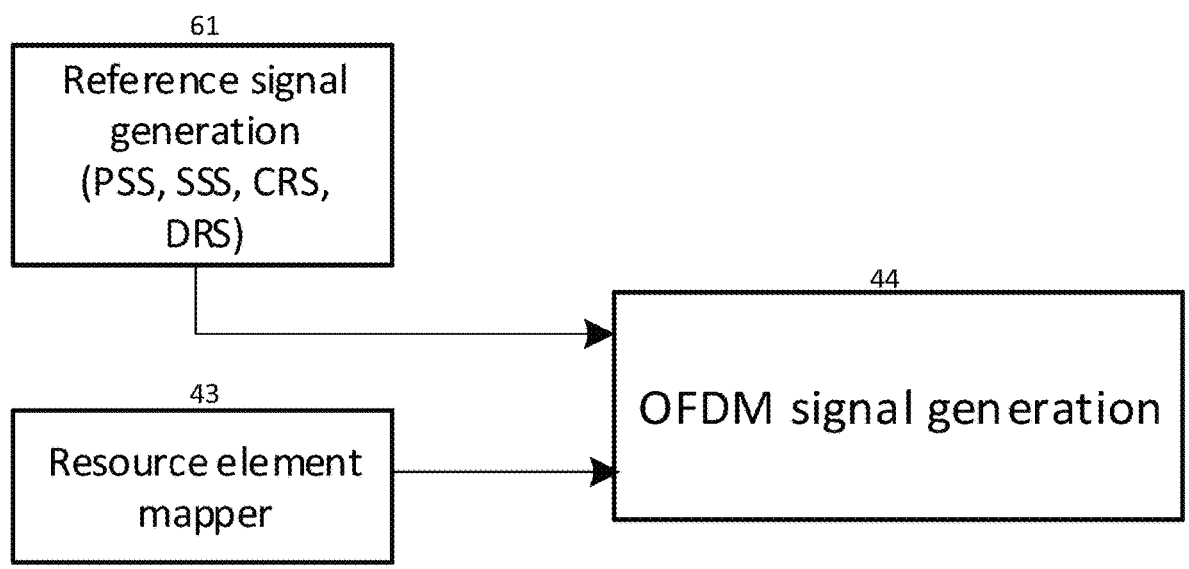
FIG. 6 illustrates the generation of the reference signals at the RU in accordance with an example embodiment of the present disclosure.

FIG. 6 illustrates an example embodiment in which the DL reference signals that are not associated with the DL data transmission are supported in the RU. As shown in FIG. 6, the following example DL reference signals can be supported in the RU: primary synchronization signal (PSS), secondary synchronization signal (SSS), cell-specific reference signal (CRS), and discovery reference signal (DRS), which reference signals are shown in FIG. 6 as being generated in the function block 61. Also shown in FIG. 6 are resource element mapper 43 and OFDM signal generation block 44. As an example, these reference signals can be inserted after the precoding into the inverse fast Fourier transform (IFFT) subcarriers (e.g., in the OFDM signal generation block 44 shown in FIG. 6).

At least two motivating considerations exist for the example embodiment described above in connection with FIG. 6. First, during a live migration process (which is defined in the document published by NGMN Alliance, "Further Study on Critical CRAN Technologies," *Next Generation Mobile Networks*, V1.0, March 2015), for resource pooling in BBU to change the number of active cores, it is expected that there may be a downtime of <100 ms. During this downtime, the RU should stay alive and continue its transmissions of reference signals so that the attached UEs don't lose connectivity during the migration. The PSS, SSS and CRS signals would need to be continuously transmitted by the RU in this transition so that new UEs can still listen to these signals and existing UEs can keep their synchronization to the base station. Second, for licensed-assisted access (LAA), the transmitter should respond with discovery reference signal (DRS) transmissions within 9 µs if listen-before-talk (LBT) is successful. The configuration of reference signals can be done dynamically based on the NR/LTE numerology.

Figure 7:
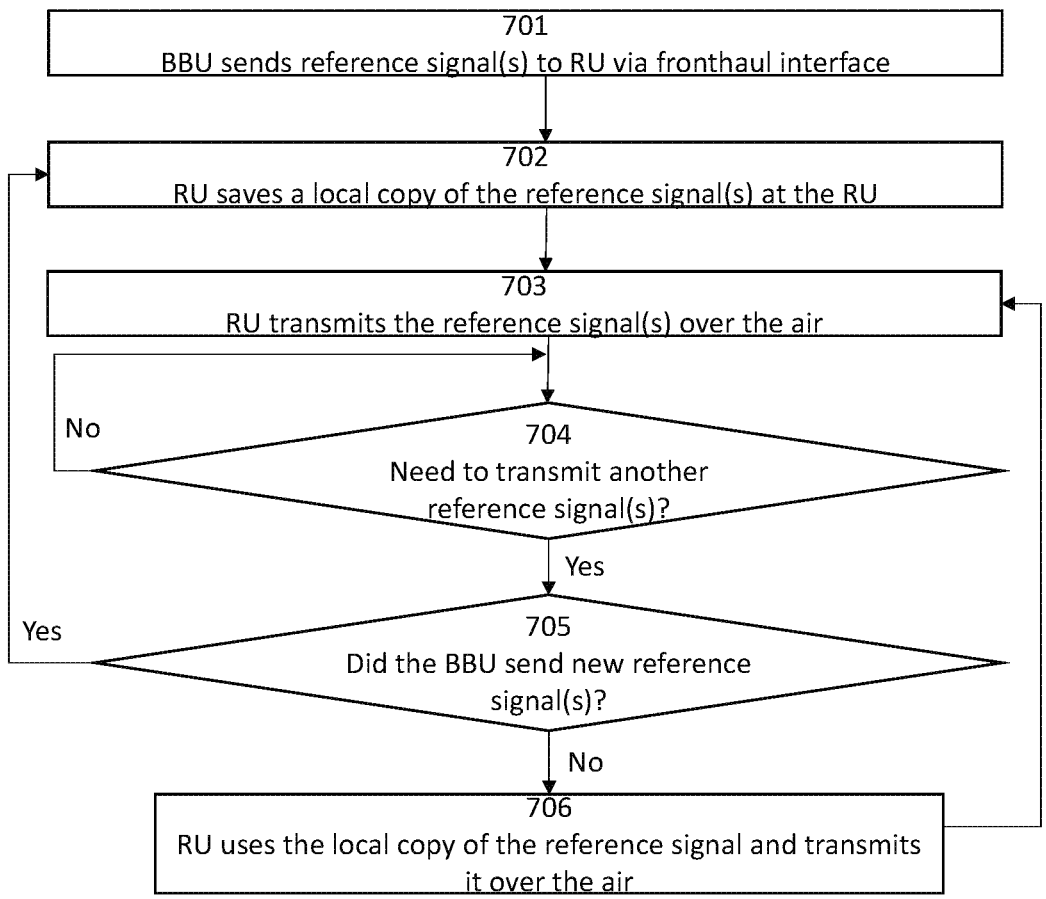
FIG. 7 illustrates a logic flow of an example embodiment of the present disclosure in which the RU caches a local copy of the reference signals to be used if no new signal is received from the BBU.

FIG. 7 illustrate a logic flow in accordance with an example embodiment of the present disclosure, in which the reference signals are generated at the BBU to provide more flexibility and virtualization benefits. Based on the reference signal transmission period, the BBU generates and sends, at block 701 of FIG. 7, the reference signal(s) to the RU via the fronthaul interface. Once the reference signal is received, the RU saves, at block 702, a local copy of the reference signal at the RU. At block 703, RU transmits the received reference signal over the air. Every time the RU receives the latest reference signal from the BBU, the RU overwrites the existing local cache of the reference signal with the latest reference signal from the BBU. At block 704, it is determined whether the RU needs to transmit another reference signal. If the RU needs to transmit another reference signal, it is next determined, at block 705, whether the BBU sent a new reference signal. If the BBU did not send a new reference signal, i.e., the RU did not receive the reference signal from the BBU, e.g., due to live migration, lost connection between the BBU and the RU, etc., the RU uses, at block 706, the local copy of the reference signal obtained from the local memory at the RU and transmits it over the air. The RU continues to look for the reference signal sent from the BBU, and the RU transmits the local copy of the reference signal from the local memory at the RU to keep the UE connected to the network until the BBU and/or the fronthaul interface comes back to operation. This can also be done to minimize fronthaul traffic overhead for reference signal transmissions.

In an example embodiment of the present disclosure, some of the basic reference signals that are needed to keep the cell alive and the UEs connected, e.g., PSS, SSS, CRS, DRS, etc., can be generated at the RU to maintain continuous connectivity with the UE without the need for local buffers at the RU. On the other hand, other reference signals, e.g., CSI-RS, DM-RS, MBSFN, etc., which require more configuration for user-specific or channel-specific configurations can be generated at the BBU to provide more virtualization benefits and ease of migration to 5G.

Figure 8:
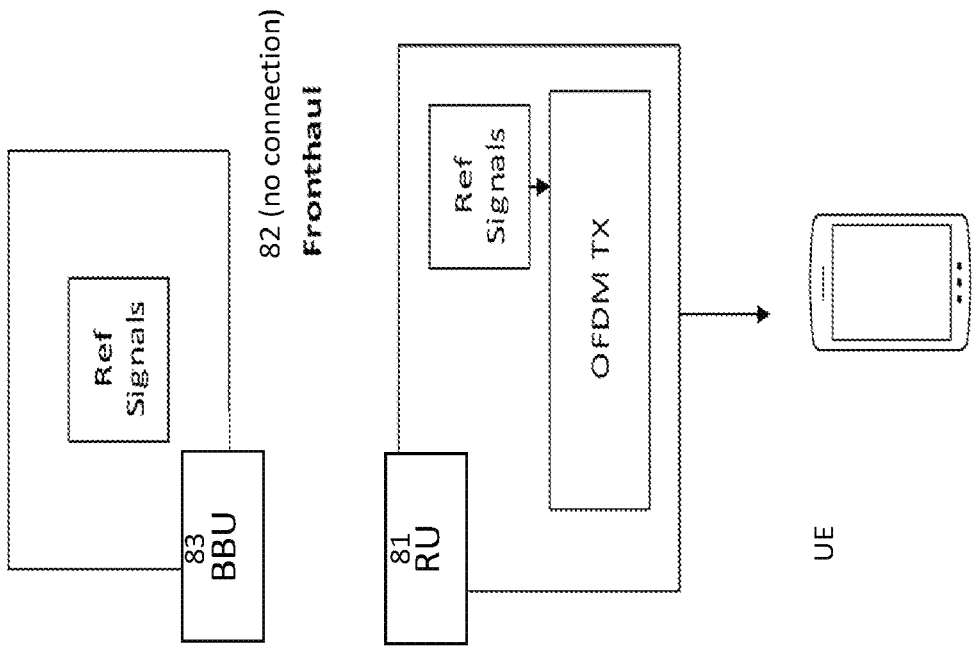
FIGS. 8A and 8B illustrate an example embodiment of the present disclosure in which the reference signals are transmitted by the RU in the case the BBU is temporarily inaccessible.
Figure 8:
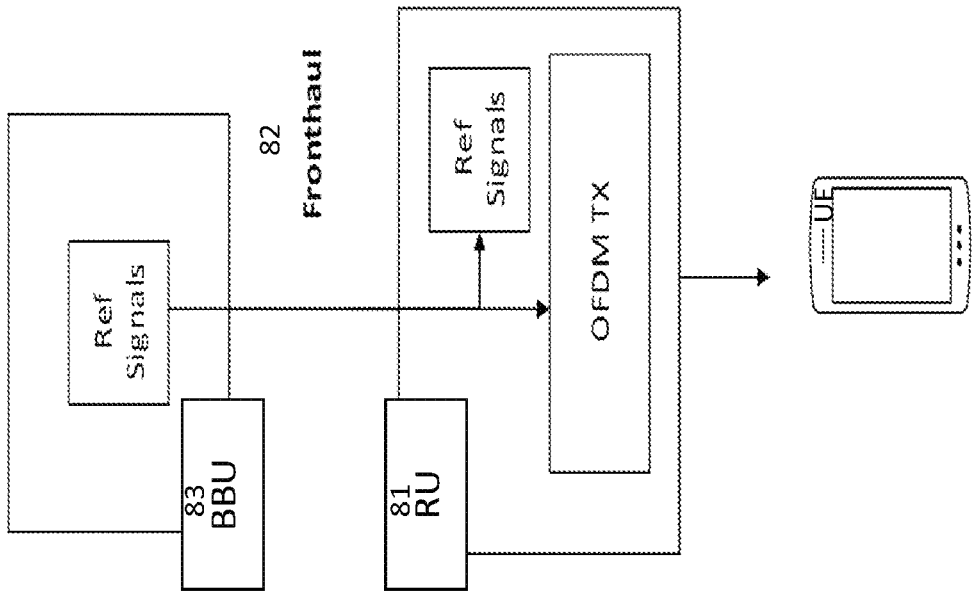

FIG. 8A illustrates the reference signal transmissions from the RU 81 in accordance with an example embodiment when the reference signals are received from the BBU 83. In this case, the received reference signals can be transmitted by the RU 81, and also saved at the RU 81 for future transmissions if needed. FIG. 8B illustrates the reference signal transmissions in accordance with an example embodiment when the reference signals are not available from the BBU 83, which can be due to the fronthaul 82 or the BBU 83 losing connectivity with the RU 81, or to save transmission overhead on the BBU 83. In this case, the reference signals are generated at the RU 81 itself, e.g., by obtaining the local copy of the reference signal stored at the RU 81.

In one example embodiment, the reference signal transmission intervals from the BBU to the RU can also be made configurable by the BBU. In this embodiment, the RU knows in advance when to use the local copy of the reference signal and when to use the reference signal transmissions received from the BBU.

In another example embodiment, the reference signal transmission from the BBU to the RU can be adapted based on the fronthaul bit rate. For example, for a high fronthaul bit rate above a predetermined threshold (e.g., due to using high-order MIMO configurations, high number of attached UEs, high traffic, etc.), the RU uses the local copy of the reference signals for transmission over the air. On example implementation of this feature can be achieved, for example, by transmitting a control signal from the BBU to the RU to start using the local copy of the reference signals. Another example implementation of this feature is to use a timer at the RU to check for the reference signals from the BBU within a predetermined time period, and upon expiration of the time period without receiving the reference signals from the BBU, the RU starts using the last local copy of the reference signals. To start live reception of the reference signals from the BBU (e.g., in the case of low traffic, small number of UEs, etc.), a control signal can be transmitted from the BBU to the RU.

In another example embodiment, the reference signal transmission from the BBU to the RU can be adapted based on the fronthaul latency. For a large fronthaul latency, e.g., larger than a predetermined threshold, the RU can use the local copy of the reference signal stored at the RU for transmission over the air. On the other hand, for a short fronthaul latency, the BBU can continuously send the reference signals to the RU. Enabling and disabling of reference signals transmission from the BBU can be implemented by using control messages exchanged between the RU and the BBU.

Figure 9:
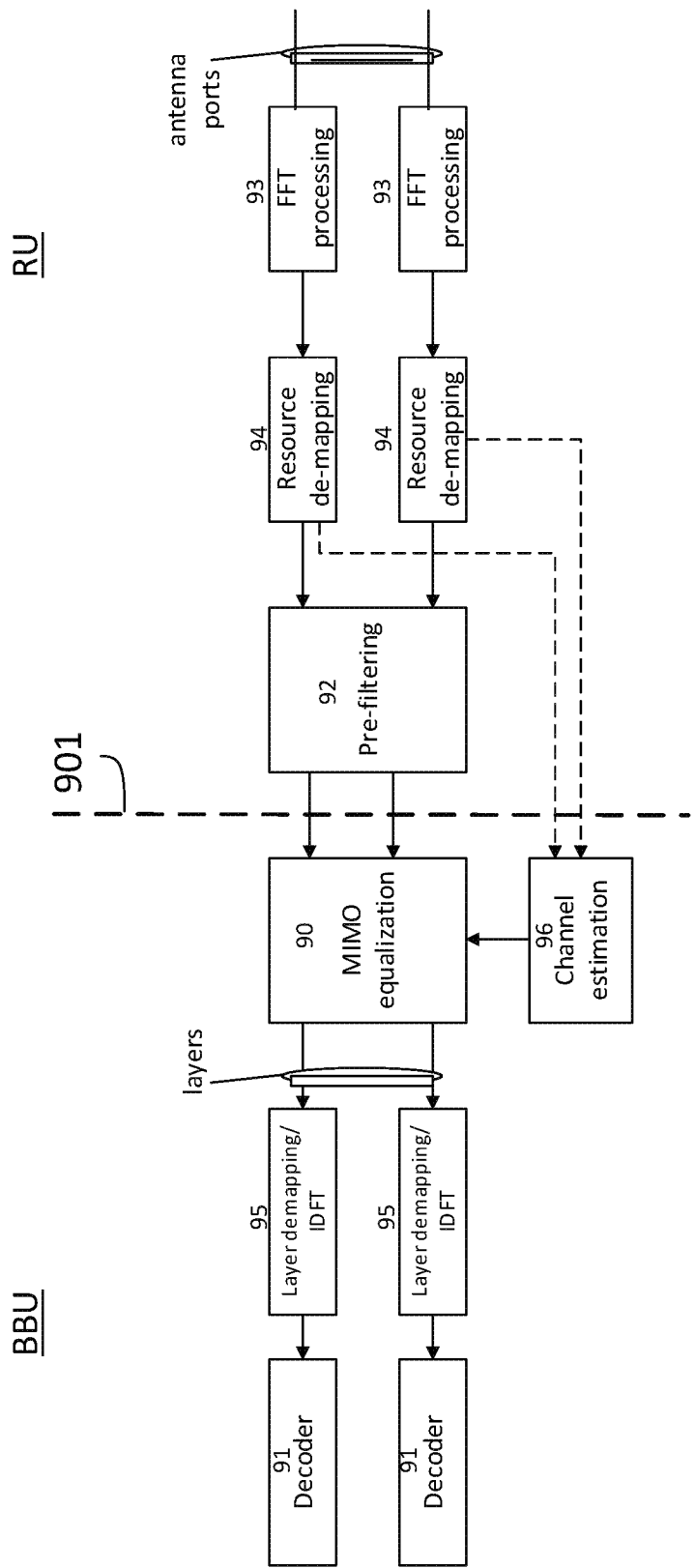
FIG. 9 illustrates a functional split for the UL processing chain.

FIG. 9 illustrates an example embodiment of the present disclosure, in which the data channel split and the control channel split are provided for the uplink (UL) between the RU and the BBU, as indicated by the dotted line 901. In this example embodiment, MIMO equalization block 90 and decoder 91 are provided in the BBU to allow for more advanced receivers and for joint reception (JR) and joint processing (JP) across DUs for UL coordinated multipoint transmission (COMP). In addition, a pre-filtering block 92 is provided to achieve, among other purposes, the goal of reducing the number of antennas into a smaller number of streams (or layers), which can support MMSE-IRC functionality, e.g., to provide performance gains while reducing transport requirements to send all diversity antenna processing to the BBU. Also shown in FIG. 9 are: FFT processing blocks 93, resource de-mapping blocks 94, layer de-mapping/IDFT blocks 95, and channel estimation block 96.

For certain JP/JR scenarios in COMP, or for more complex processing, an alternative example embodiment may be provided with a pre-filtering bypass mode in which outputs from the FFT processing block 93 can be sent directly to the MIMO equalization block 90. For example, pre-filtering modes could include the following: antenna selection, MMSE-MRC, MMSE-IRC, and bypass, which modes can be pre-selected by the BBU. Thus, both fronthaul split options 7-1 and 7-2 can be supported on the UL. The pre-filtering configuration and the pre-filtering coefficients can be generated at the BBU. The configuration of blocks such as FFT can be achieved dynamically based on the NR/LTE numerology.

In addition, the RU can support one or more pre-filtering options. The pre-filtering options can be checked by the BBU based on the RU capability, and the BBU can select the pre-filtering configuration based on a table, e.g., as shown in Table 1, and the BBU can configure the RUs with the selected configuration.

TABLE 1

| Configuration bits | RU configuration |
|---|---|
| 00 | Antenna selection |
| 01 | MMSE-MRC |
| 10 | MMSE-IRC |
| 11 | Bypass mode |

In one example embodiment in accordance with the present disclosure, the pre-filtering can be a function of the fronthaul bandwidth. For example, if sufficient fronthaul bandwidth above a predetermined threshold exists, e.g., bandwidth of 10 Gigabit Ethernet (GbE) exists, pre-filtering is bypassed. On the other hand, for limited fronthaul bandwidth below a predetermined threshold exists, e.g., bandwidth of 1 GbE exists, pre-filtering is enabled.

Figure 10:
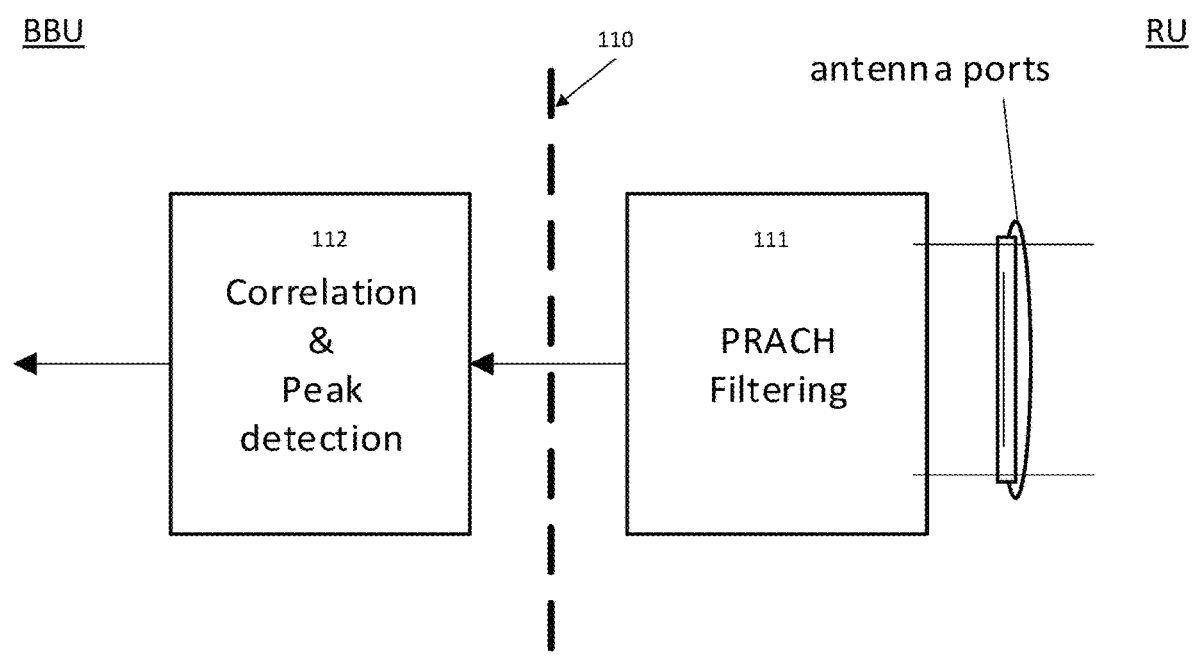
FIG. 10 illustrates a functional split for the physical random-access channel (PRACH).

FIG. 10 illustrates an example embodiment in accordance with the present disclosure, in which the PRACH function split (indicated by the dotted line 110) is provided for the uplink (UL) between the RU and the BBU. PRACH filtering (as represented by block 111) can be performed in the RU, while the correlation and peak detection functions (as represented by block 112) can be performed in the BBU. There may be a configuration for PRACH for NR based on the use case The UL reference signal processing such as SRS and UL DMRS will be also performed in the BBU.

In another example embodiment in accordance with the present disclosure, the entire PRACH processing can be performed on the RU. The detected PCI and the timing advance parameter can be passed to the BBU over the fronthaul interface.

A similar scheme to the PRACH functionality can also be used for supporting the network listen mode on the fronthaul interface to detect adjacent cell physical cell ID (PCI) for the purpose of self-organizing network (SON).

Figure 11:
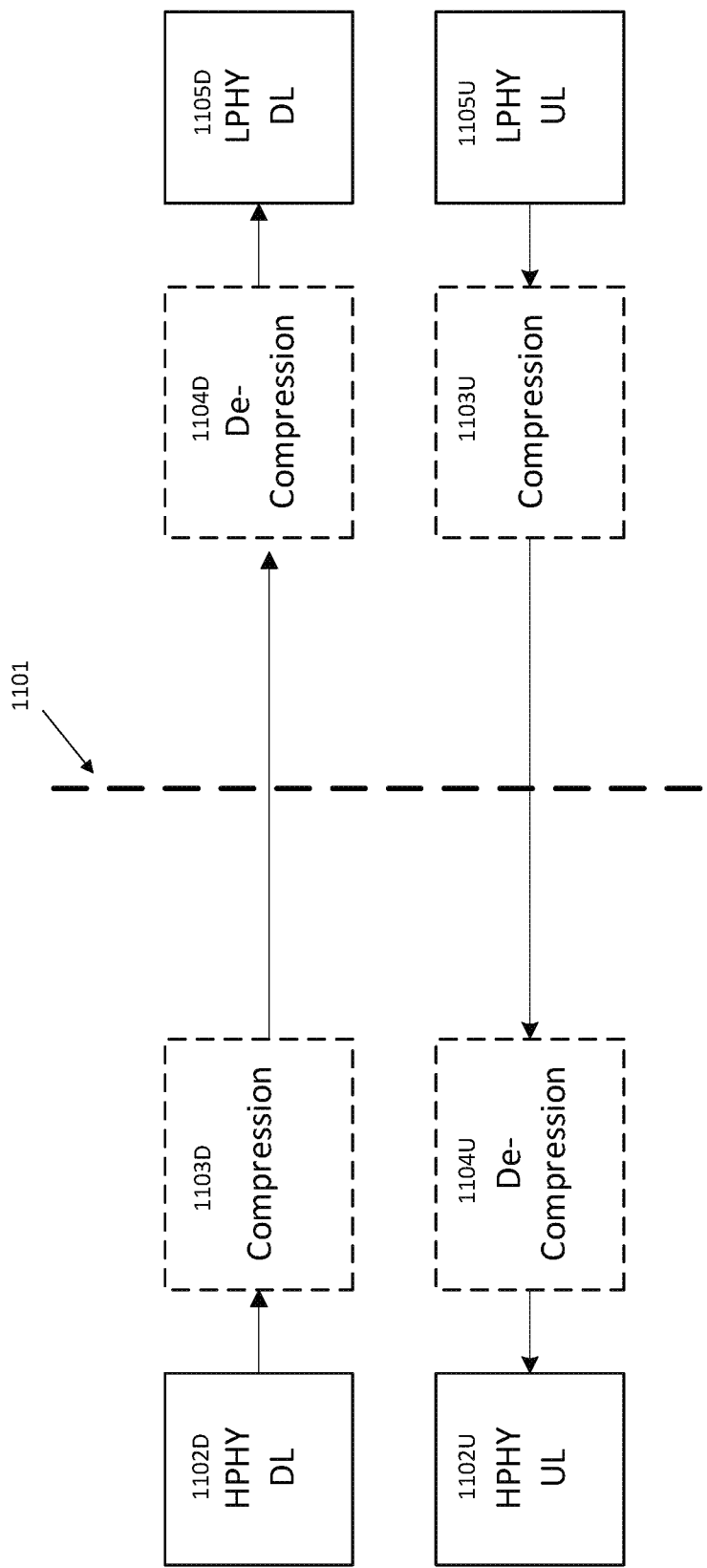
FIG. 11 illustrates an example embodiment in accordance with the present disclosure in which compression and decompression techniques are applied to improve the fronthaul efficiency.

FIG. 11 illustrates an example embodiment in accordance with the present disclosure, in which further compression and decompression techniques are applied to improve the fronthaul efficiency. FIG. 11 shows the following: fronthaul split 1101; HPHY DL block 1102D; HPHY UL block 1102U; compression block 1103D for DL; compression block 1103U for UL; decompression block 1104D for DL; decompression block 1104U for UL; LPHY DL block 1105D; and LPHY UL block 1105U. In the example embodiment illustrated in FIG. 11, the bit-widths for UL can be adjusted dynamically based on the modulation scheme, which can be provided to the RU by the BBU, and the signal-to-interference-plus-noise ratio (SINR), which can be computed either at the BBU or the RU. In addition, only the tones that carry useful information are transmitted on the fronthaul, and the RU and the BBU assume there is no data on the remaining tones.

Figure 12:
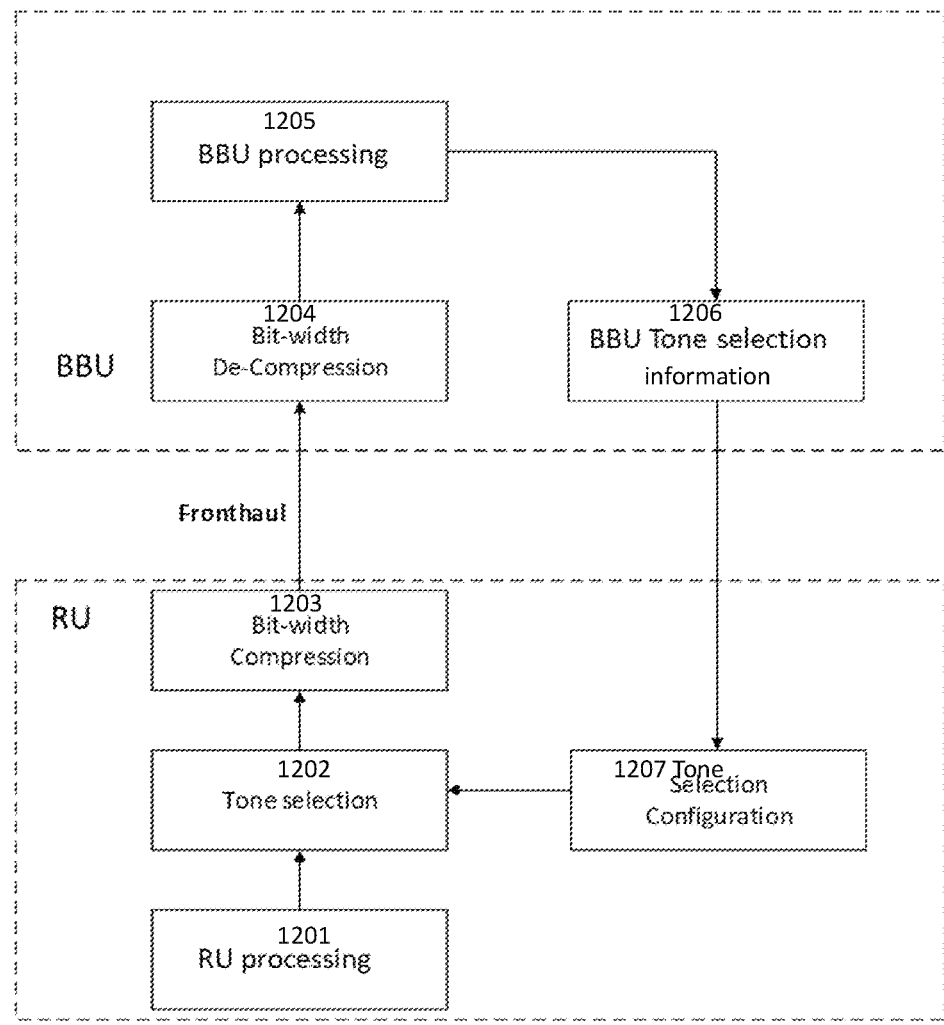
FIG. 12 illustrates an example of bit-width compression/decompression at the BBU and RU.

FIG. 12 illustrates an example embodiment in accordance with the present disclosure, in which the UL data is compressed before it is sent to the BBU. FIG. 12 shows the following: RU processing block 1201; tone selection block 1202 in RU; bit-width compression block 1203 in RU; bid-width decompression block 1204 in BBU; BBU processing block 1205; tone selection information block 1206 in BBU; and tone selection configuration block 1207 in RU. In the example embodiment of FIG. 12, the compression happens in two forms: (a) tone selection (block 1202), in which only useful tones are sent to the BBU; and (b) bit-width compression (block 1203), in which the tone bit-widths are compressed. For tone selection, one example method provides for the BBU to inform the RU about the tones required (block 1206). This information would require close interaction with the scheduler, which could change dynamically and require overhead on the fronthaul. In addition, since low latency applications are envisioned for 5G, the possibility of insufficient time to schedule such transmissions in advance needs to be considered.

For the foregoing reasons, options to reduce the fronthaul overhead are helpful, some examples of which options are listed in TABLE 2 below. One example option to reduce the fronthaul overhead is to send only PRACH tones to BBU. This example configuration would be valid, for example, when there is no activity in the cell, i.e., the cell is idle. Another example configuration would be to send only PRACH+PUCCH+DMRS tones to BBU. Such a configuration would be valid when there are users in the cell but none of them are active. This could be useful for IoT applications. Another example configuration would be to send only tones indicated by the BBU for all symbols in a subframe. The tone selection information sent by the BBU to the RU can change every subframe, if needed, or can be kept semi-static for a frame or longer periods of time.

TABLE 2

| Selection configuration by BBU | RU tone configuration for subframe |
| --- | --- |
| 00 | Send only PRACH tones |
| 01 | Send PRACH + PUCCH + DMRS tones |
| 10 | Send all tones |
| 11 | Send only tones indicated by BBU |

The bit-width quantization can be done using multiple techniques: (a) using A-law, μ-law based compression schemes that are used in audio codecs; and (b) adapting the bit-width to the SINR and the constellation of the signals. For example, tones with 64-QAM and high SINR can use more bit-width than 16-QAM and low SINR signals, which can have more compression.

In one example embodiment in accordance with the present disclosure, selected compression techniques can be enabled or disabled based on the fronthaul bit rate (which can be a function of the number of attached UEs, traffic, etc.) and/or the compression/decompression processing latency. For high traffic, highly-optimized compression/decompression techniques may be used to reduce the fronthaul overhead. On the other hand, for low latency applications, some compression/decompression techniques can be omitted to reduce processing time. Control messages can be defined and transmitted between the BBU and the RU to selectively enable and disable various compression techniques in an adaptive fashion.

In another example embodiment in accordance with the present disclosure, the BBU can inform the RU about the compression method to use for the data. This can be changed on a dynamic basis. The BBU can send a message to the RU with a field that defines the compression method and IQ bit width for the user data.

In another example embodiment in accordance with the present disclosure, wireless network operators may choose the fronthaul functional split based on the deployment conditions. For conditions in which the fronthaul is limited in bandwidth (e.g., only can support 1 GbE), higher functional splits such as 3GPP split option 7-3 can be used, i.e., for the DL, only the bit processing encoder resides in the BBU, and the rest of the PHY functions reside in the RU. Since such splits come at the trade-off of increased complexity at the RU, it can be used for base-stations with small antenna configurations, e.g., small cells. For conditions in which high bandwidth fronthaul exists to support Gb/s data rates via fiber (e.g., 10 GbE or higher) with larger antenna arrays (e.g., 64 or larger antennas for massive MIMO), radio complexity may be more critical than compression. In such a case, a lower functional split such as 3GPP split option 7-2 can be used that reduces complexity but provides limited compression compared to 3GPP split option 7-3. 3GPP split option 7-2 divides the functionalities for the UL in the following manner: FFT, CP removal, resource de-mapping and optionally pre-filtering functions reside in the RU, and the rest of the PHY functions reside in the BBU. The split option 7-2 divides the functionalities for the DL in the following manner: iFFT, CP addition, resource mapping and precoding functions reside in the RU, and the rest of the PHY functions reside in the BBU.

In an example embodiment in accordance with the present disclosure, the fronthaul functional split can be based on the number of antennas on the RU. A radio unit with smaller number of antennas (e.g., <=4 antennas) could support more compression with a higher functional split (e.g., split option 7-3) since it could be lower in complexity, while a radio unit with larger number of antennas (e.g., >=8 antennas) could support less compression but with a lower functional split (e.g., split option 7-2).

In an example embodiment in accordance with the present disclosure, the fronthaul functional splits are dependent on the LTE MIMO transmission mode. A transmission mode for small antenna configurations (e.g., <=4 antennas) could use a higher compression functional split such as 3GPP split option 7-3. A transmission mode for larger antenna configurations (e.g., >=8 antennas for massive MIMO use cases) could use a less complex functional split such as 3GPP split option 7-2.

In an example embodiment in accordance with the present disclosure, the functional splits are dependent on the type of MIMO precoding used for transmission. A codebook-based precoding with cell-specific reference signals could use a functional split (e.g., option 7-3), while a channel state information (CSI) based precoding (or non-codebook-based precoding) can use a different functional split (e.g., option 7-2). An example of such a transmission mode with codebook-based precoding would be Transmission Mode 3 (TM3) and Transmission Mode 4 (TM4) according to LTE 3GPP Release 8, which Transmission Modes 3 and 4 support a maximum of 4 layers in LTE. An example of a CSI-based transmission mode would be Transmission Mode 9 (TM9) according to LTE 3GPP Release 10.

In one example embodiment in accordance with the present disclosure, for 3GPP transmission mode (TM) 8-10 and for 5G new radio (NR), the precoding can be implemented in the BBU, thereby allowing the RU to use a fixed grid of beams (digital or analog) without incorporating the precoding into the beamforming operation. On the other hand, for 3GPP TM3 and/or TM4, the precoding can be implemented at the RU. For transmit diversity case, the modulated symbols are sent over the fronthaul interface, and all the remaining PHY functions such as layer mapping, precoding and antenna port mapping are implemented at the RU.

In another example embodiment in accordance with the present disclosure, the fronthaul functional splits are dependent on the fronthaul bandwidth available for deployment. For example, if the fronthaul bandwidth is limited to 1 GbE, a higher compression split (e.g., 3GPP split option 7-3) is used, while a lower compression split (e.g., 3GPPP split option 7-2) is used if the fronthaul bandwidth is sufficiently large (e.g., 10 GbE).

Figure 13:
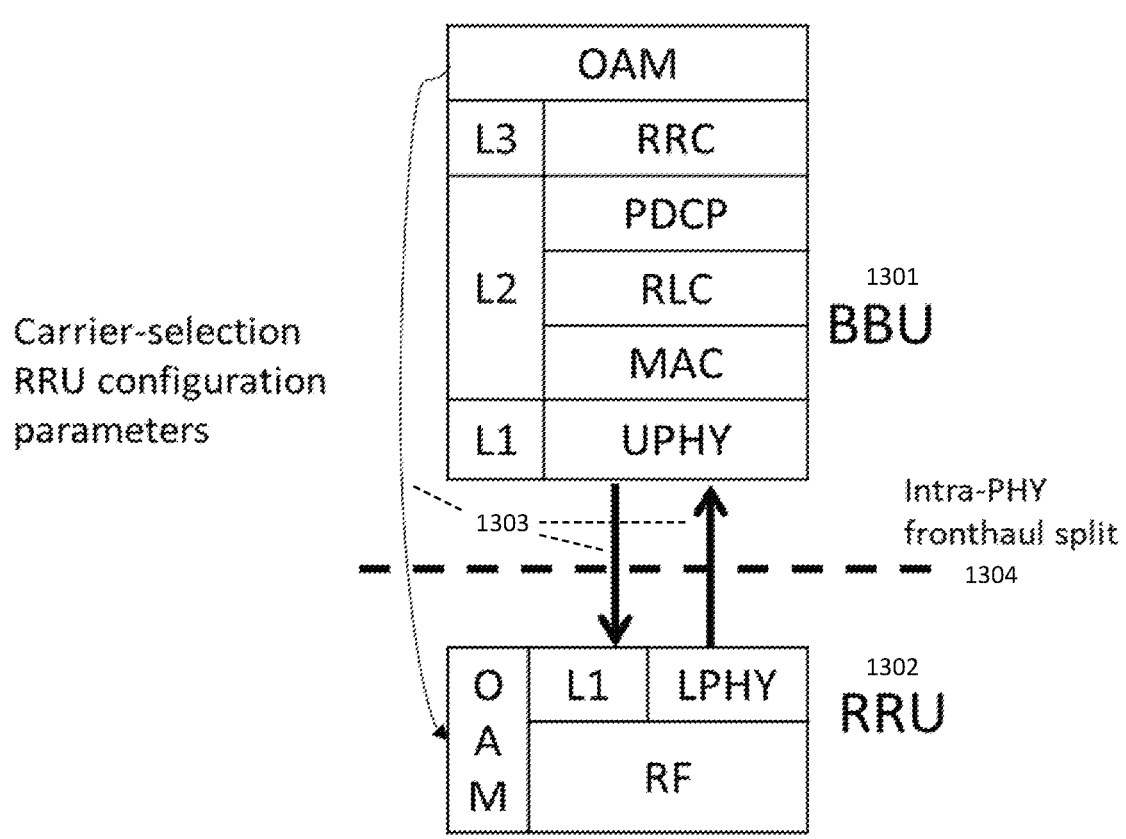
FIG. 13 illustrates an example of carrier-selection and dynamic frequency selection (DFS) configuration parameters transmission from BBU to RRU.

FIG. 13 illustrates an example embodiment in accordance with the present disclosure, in which the BBU 1301 configures the RRU 1302 via the operation and management (OAM) (or non-real-time) interface with the carrier-selection configuration parameters needed for LAA, e.g., the energy detection threshold, target band (e.g., 5 GHz band), scanning period, etc. These configuration parameters need to be sent from the BBU to the RU via the fronthaul link 1301. The intra-PHY fronthaul split is indicated by the dotted line 1304. The target band can be used by the BBU 1301 to determine the specific band (e.g., UNII-3, UNII-1 band, etc.)

that need to be scanned so that the best channel to be used can be determined. The energy detection threshold helps the RRU 1302 to determine the signal level for a channel, using which the RRU 1302 can determine the channel to be idle or busy. The scanning period defines the time duration, for which duration the RRU 1302 needs to sense every channel in the target band. The above configuration parameters are merely examples and are not intended to be restrictive.

Figure 14:
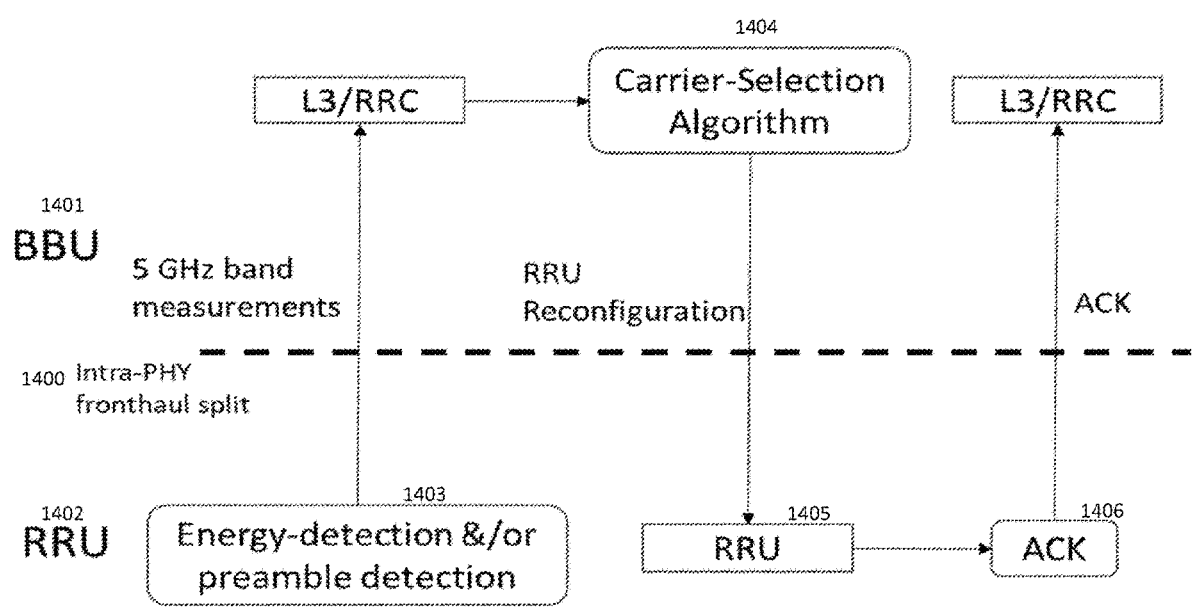
FIG. 14 illustrates communication between the BBU and RRU, along with the location of different functions to execute carrier selection and DFS.

FIG. 14 illustrates an example embodiment in accordance with the present disclosure, in which multiple modifications are provided in the intra-PHY fronthaul interface for carrier-selection phase in LAA. The intra-PHY fronthaul split is indicated by the dotted line 1400. After receiving the configuration parameters, the RRU 1402 performs spectrum sensing/scanning (block 1403) using any of the sensing techniques such as energy detection, preamble detection, waveform-based sensing, cyclostationary sensing, etc., to determine if the state of the different channels in the target band is either idle or busy. The RRU 1402 sends via the fronthaul a message to the BBU 1401 containing different metrics about the scanned channels such as the occupancy ratio (ratio between busy duration to total scanning duration), average RSSI, and interference type (e.g., Wi-Fi, LAA, LTE-U, MulteFire, etc.), which metrics are shown in FIG. 14 as "5 GHz band measurements." Using the received metrics, the BBU 1401 applies a carrier-selection algorithm (block 1404) to determine the best channel to be used for data transmission. The BBU 1401 informs different layers of the LTE protocol stack about the new configured channel. The BBU 1401 sends another message to the RRU 1402 via the fronthaul management (or non-real-time) interface with the new configured channel based on the carrier-selection algorithm at the BBU 1401. Once the second message is received at the RRU 1402, the RRU 1402 reconfigures (block 1405) the RF oscillator and the RF parameters to operate on the new channel. The RRU 1402 informs (block 1406) the BBU 1401 that the new configured parameters are accepted for the upper layers to start sending data via the fronthaul to the RRU 1402.

Figure 15:
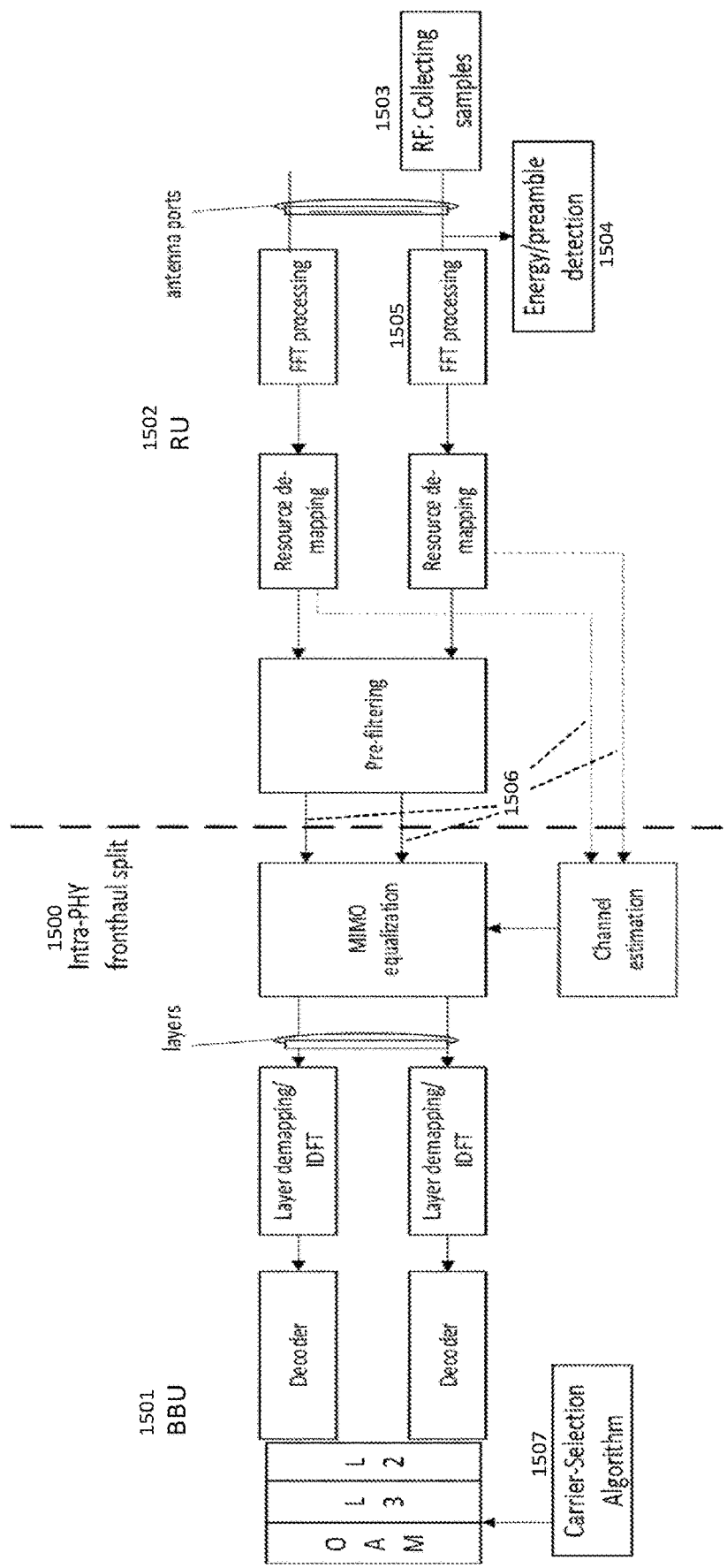
FIG. 15 illustrates another example embodiment of the present disclosure for carrier-selection and DFS implementation at the BBU and RU.

FIG. 15 illustrates an example embodiment in accordance with the present disclosure, in which various modules of the BBU 1501 and the RU 1502 for implementing carrier-selection are provided. The RU 1502 collects samples (block 1503) on different channels in the target band based on the configuration parameters received from the BBU 1501. In one example implementation, the RU processes these samples locally and sends the outcome of the spectrum sensing process (e.g., occupancy ratio, average RSSI, etc.) (blocks 1504 and 1505) to the BBU to reduce the size of the packet sent via the fronthaul interface 1506. In one example implementation, the carrier-selection algorithm (block 1507) is executed at the BBU, where L3 is responsible for cell-bring-up procedure. The benefits of using this example implementation is to maximize the benefits of virtualization by executing the algorithms in the BBU while minimizing the fronthaul overhead.

Some aspects of carrier selection are summarized below:
Given a large available bandwidth of unlicensed spectrum, carrier selection is required for LAA nodes to select the carriers with low interference and thereby achieve good co-existence with other unlicensed spectrum deployments.
Multiple messages need to be defined between the RRU and L3/OAM as part of the carrier-selection procedure.

There are multiple channels in the UNIT band, and the BBU/vBBU does not know initially which one of these channels to select to operate on since no information is available yet.
Hence, the first step is to let the RRU sense the 5 GHz channels and report the measurements to the BBU/vBBU.
The BBU/vBBU can then select the best channel (based on the reported measurements) for the RRU to operate on.
This carrier selection process will occur periodically at the RRU, and measurements will be reported to the BBU/vBBU to re-select the carrier frequency, if needed, based on interference.
In summary, frequency configuration in the unlicensed band is occurring from bottom (LPHY-RRU) to up (BBU/vBBU). Eventually, the BBU/vBBU makes the carrier frequency selection, but this is based on the RRU measurements.

FIG. 16 illustrates an example embodiment in accordance with the present disclosure, in which the BBU 1601 configures the RRU 1602 with the discovery reference signal (DRS) configuration parameters (via the operation and management (OAM) (or non-real-time) interface) needed for LAA, e.g., discovery measurement timing configuration (DMTC) period, DMTC offset, energy-detection threshold, etc. The DMTC period is a time window within which the UE can expect the DRS to be received. While the DRS occasion may occur anywhere in the DMTC period, the UE may expect the DRS to be transmitted from a given cell so that the duration between successive DRS transmissions is fixed (e.g. 40, 80 or 160 ms). In FIG. 16, the fronthaul link is indicated as 1603, and the intra-PHY fronthaul split is indicated by the dotted line 1604.

Figure 17:
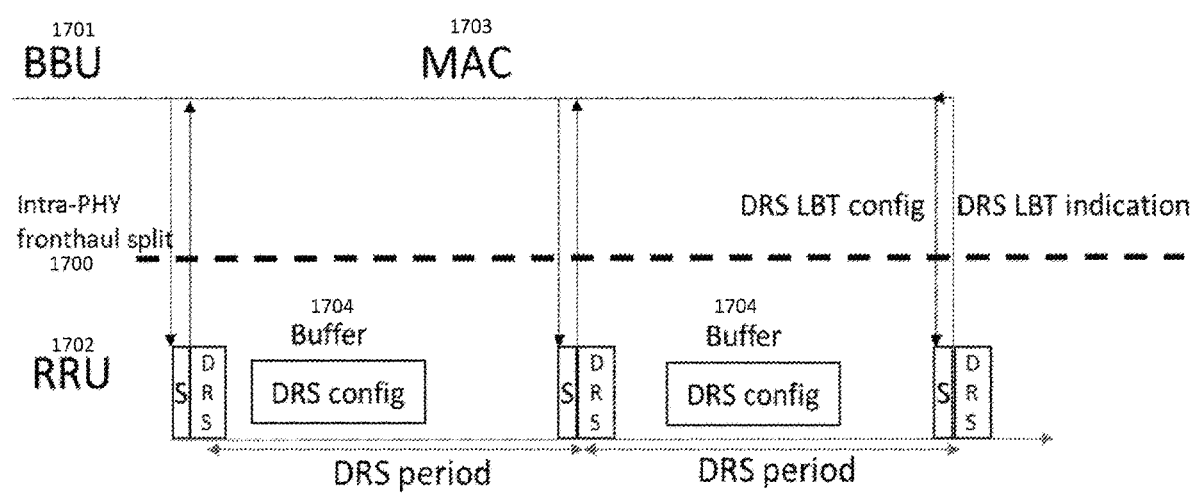
FIG. 17 illustrates an example communication between the BBU and RU regarding DRS transmission.

FIG. 17 illustrates an example embodiment in accordance with the present disclosure, in which modifications in the intra-PHY fronthaul interface for discovery reference signal (DRS) transmission in LAA are provided. The MAC layer 1703 in the BBU 1701 configures the RRU 1702 with the DRS parameters prior to each DRS instant. After executing spectrum sensing (denoted by 'S' in FIG. 17) by the RRU 1702, the RRU 1702 sends an indication to the BBU 1701 about the outcome of the energy detection. The RRU 1702 keeps the DRS configurations at a local buffer 1704, which buffered DRS configurations can be used in case of live migration. The buffer information will be updated periodically after each DRS transmission. In another example embodiment, the BBU 1701 sends a new copy of the DRS signal every subframe as long as the spectrum sensing outcome received from the RRU 1702 is busy and the DMTC duration has not ended, thereby reducing the requirements on the buffer 1704 at the RRU 1702. In FIG. 17, the intra-PHY fronthaul split is indicated by the dotted line 1700.

Figure 18:
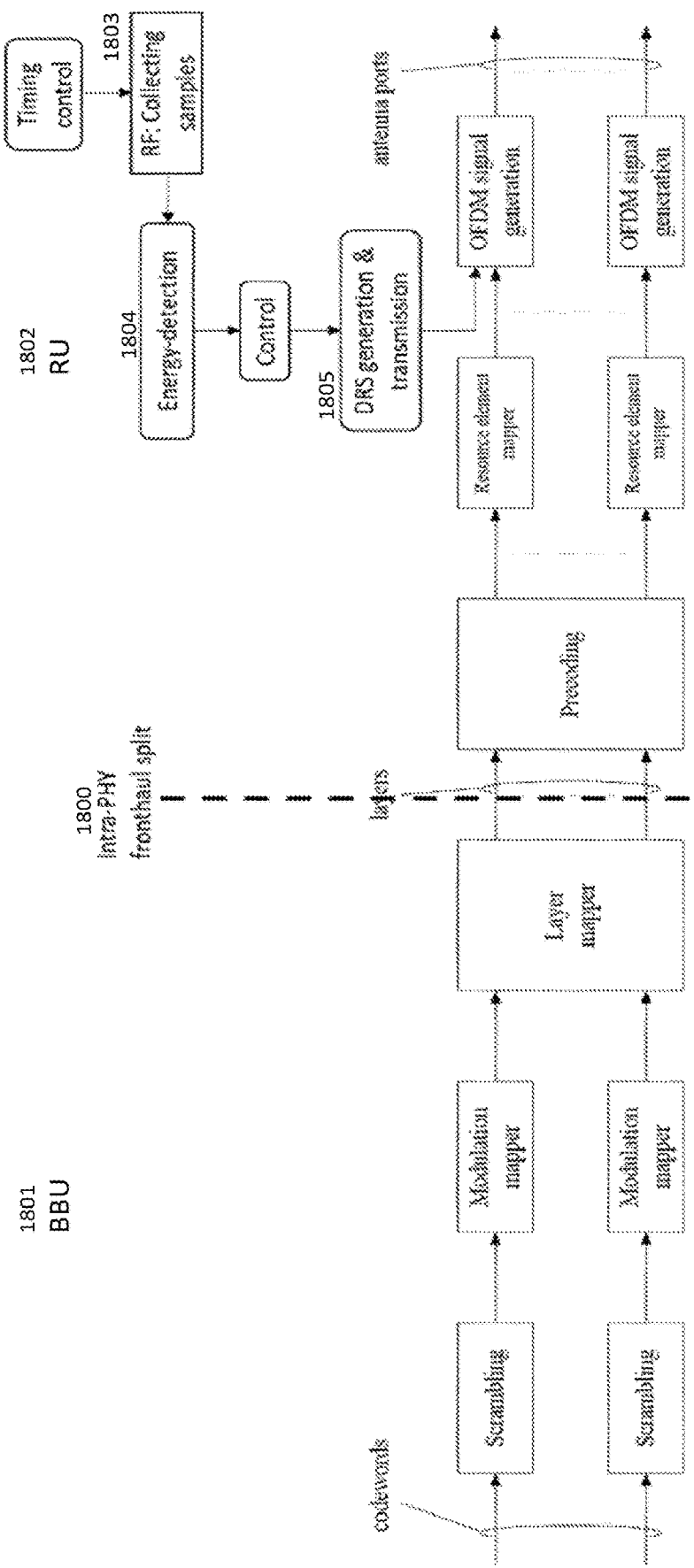
FIG. 18 illustrates another example of DRS implementation at the BBU and RU.

FIG. 18 illustrates an example embodiment in accordance with the present disclosure, in which various modules of the BBU 1801 and the RRU 1802 for implementing DRS transmission are provided. The RRU 1802 will collect samples of the configured channel (block 1803) and execute energy detection (block 1804) at the configured DRS time. Based on the outcome of the energy detection, the RRU 1802 decides whether to send the DRS or not (block 1805). The DRS configuration and indication needs to be exchanged between the BBU 1801 and the RRU 1802. In FIG. 18, the intra-PHY fronthaul split is indicated by the dotted line 1800.

Some aspects of DRS transmission are summarized below:
  BBU periodically schedules the DRS signal to be transmitted every 40, 80, or 160 ms.
  BBU sends the listen-before-talk (LBT) DRS configuration with the sensing parameters prior to each DRS transmission.
  Based on the energy detection outcome, the RRU sends the LBT DRS indication to the BBU.
  The RRU needs to save the latest DRS and LBT CAT 2 configuration. If the RRU detects a lost connection with the BBU, the RRU uses the last saved configuration and automatically sends the DRS during the DRS period using the last saved configuration. In this manner, the UE can maintain connection to the network.
  Once connection between the BBU and the RRU is restored, the RRU can be configured with the new DRS configuration, if needed.

In an example embodiment of the present disclosure, the cell-specific reference signals (CRS) from multiple antennas are multiplexed into the same physical resource block (PRB) for transmit diversity (TxD) modes.

Some aspects of the BBU implementation in accordance with the present disclosure are summarized below:
  12 REs are sent on the interface from the BBU to the RU.
  For TxD:
  For layer mapping at the RU, complex-valued modulation symbols are mapped in a sequence starting with $d^{(q)}(0), \ldots, d^{(q)}(M_{symb}^{(q)}-1)$ to frequency. REs (k,l) and are packed into a PRB, where q is the codeword, k is the subcarrier index, and l is the OFDM symbol index as defined in 3GPP TS 36.211.
  For CRS mapping at the RU, all CRS REs are mapped to frequency REs (k,l) for all layers and are packed into a PRB for transmission, and are subsequently unpacked at the RU.
  For 3GPP TM3/TM4:
  At the BBU, layer mapped symbols for each layer v, mapped in sequence starting with $x(i)=[x^{(0)}(i) \ldots x^{(v-1)}(i)]^T$ to frequency REs (k,l), are packed into each PRB, i=0, 1, . . . , $M_{symb}^{layer}-1$ sync where υ is the number of layers and $M_{symb}^{layer}$ is the number of modulation symbols per layer.
  For CRS mapping at the RU, all CRS REs for each layer are packed into a PRB for transmission, and are subsequently unpacked at the RU.

Some aspects of the RU implementation in accordance with the present disclosure are summarized below:
  The RU determines the transmission scheme using txScheme field.
  For txScheme 'TxD':
  At the RU, input modulated symbols $d^{(q)}(0), \ldots, d^{(q)}(M_{symb}^{(q)}-1$ are unpacked and used to perform layer mapping, precoding and antenna port mapping.
  The appropriate precoder is selected based on the number of layers and antenna ports.
  For antenna port mapping p={0 . . . N}, each $y(i)=[y^{(p)}(i)]^T$ RE goes to each antenna port y_p(i) after antenna port mapping. i=0, 1, . . . , $M_{symb}^{ap}-1$ to be mapped onto resources on each of the antenna ports, where $y^{(p)}(i)$ represents the signal for antenna port p.
  Since the PRB contains CRS sequences for N antenna ports, the RE extracts the CRS REs using crsSymbolNumber, crsReMask and crsShift, and maps them to the appropriate RE position, and rest of the REs are populated with zero data.
  For 3GPP TM3/TM4:
  Input layer mapped symbols $x(i)=[x^{(0)}(i) \ldots x^{(v-1)}(i)]^T$ are used to perform precoding at the RU based on codebook index (codeBookIndex), number of layers (numLayers), and layerID.
  In closed loop mode, the appropriate precoder is selected per codebook index, number of layers and antenna ports.
  In open loop mode, the codebook index field is ignored.
  The RU automatically changes the precoder per RE based on the number of antenna ports and the number of layers.
  After precoding, for antenna port mapping p={0 . . . N}, each $y(i)=[y^{(p)}(i)]^T$ RE goes to each antenna port y_p(i) after antenna port mapping.
  All PRBs contain CRS sequences for N antenna ports. Based on the layerID (layer 0), CRS sequence is extracted using crsSymbolNumber, crsReMask and crsShift, for CRS mapping to each of the antenna ports using the reMask bit field, and the CRS REs from other layers can be ignored.

The following parameters can be used for supporting precoding at the RU in accordance with the present disclosure:
  codebookIndex (precoder codebook used for transmission):
    Description: This parameter defines the indices of the precoder codebook that are used for precoding. It is to be used in conjunction with the numLayers field. (Invalid for TM1, TM2 and TM3).
    Value range: {0000 0000b-1111 1111b}
    Type: unsigned integer.
    Field length: 8 bits.
    DefaultValue: 0000 0000b (used for invalid mode).
  layerID (Layer ID for DL transmission):
    Description: This parameter defines the layer ID that are used for DL transmission in TM1-TM4.
    Value range: {0000b-1111b}. 0001b implies layer0; 0010b implies layer1; 0011b implies layer2; and 0100b implies layer3. (Invalid for TxD).
    Type: unsigned integer.
    Field length: 4 bits.
    DefaultValue: 0000 (used for invalid mode).
  txScheme (transmission scheme):
    Description: This parameter defines the TM scheme used in this section type.
    Value range: {0000b-1111b}. 0000b—Spatial multiplexing (CDD); 0001b—Spatial multiplexing (no CDD); 0010b—Transmit diversity; and 0011b-111b—reserved.
    Type: unsigned integer.
    Field length: 4 bits.
  numLayers (number of layers used for DL transmission):
    Description: This parameter defines the number of layers that are used for DL transmission in TM1-TM6.
    Value range: {0000b-1111b}. 0000b implies 1 layer; 0001 implies 2 layers; 0010 implies 3 layers; and 0011b implies 4 layers,
    Type: unsigned integer.
    Field length: 4 bits.
  crsReMask (CRS resource element mask):
    Description: This parameter defines the CRS Resource Element (RE) mask within a PRB. Each bit setting in the crsReMask indicates if the section control is applicable to the RE sent over the fronthaul interface (0=not applicable, 1=applicable).
    Value range: {0000 0000 0000b-1111 1111 1111b}

Type: unsigned integer (bit mask).
Field length: 12 bits.
crsSymlNum (CRS symbol number indication):
Description: This parameter defines the CRS symbol number within a PRB. The value of the crsSymNum index indicates the symbol number to the RE sent over the fronthaul interface (0=not applicable, 1=applicable).
Value range: {0000b-1111b}, value indicates symbol number. 0000b-1101b: use symbol number 0-13 respectively; 1110b-1111b: reserved
Type: unsigned integer.
Field length: 4 bits.
crsShift (crsShift used for DL transmission):
Description: This parameter indicates the shift pattern to pick up the right index for CRS positions for N antennas.
Value range: 0 implies shift pattern applicable for $0 \leq vshift \leq 2$; and 1 implies shift pattern applicable for $3 \leq vshift \leq 5$.
Type: binary.
Field length: 1 bit.

|  | 1 Layer | 2 Layers | 4 Layers |
| --- | --- | --- | --- |
| crsShift | = 0 for $0 \leq vshift \leq 5$ | 0 for $0 \leq vshift \leq 2$<br>1 for $3 \leq vshift \leq 5$ | 0 for $0 \leq vshift \leq 2$<br>1 for $3 \leq vshift \leq 5$ |

Based on numLayers, crsShift, crsSymNum and crsReMask bit positions, CRS ports are mapped to the appropriate RE position, and the rest are left blank. A few example cases in accordance with the present disclosure are explained below.

Figure 19:
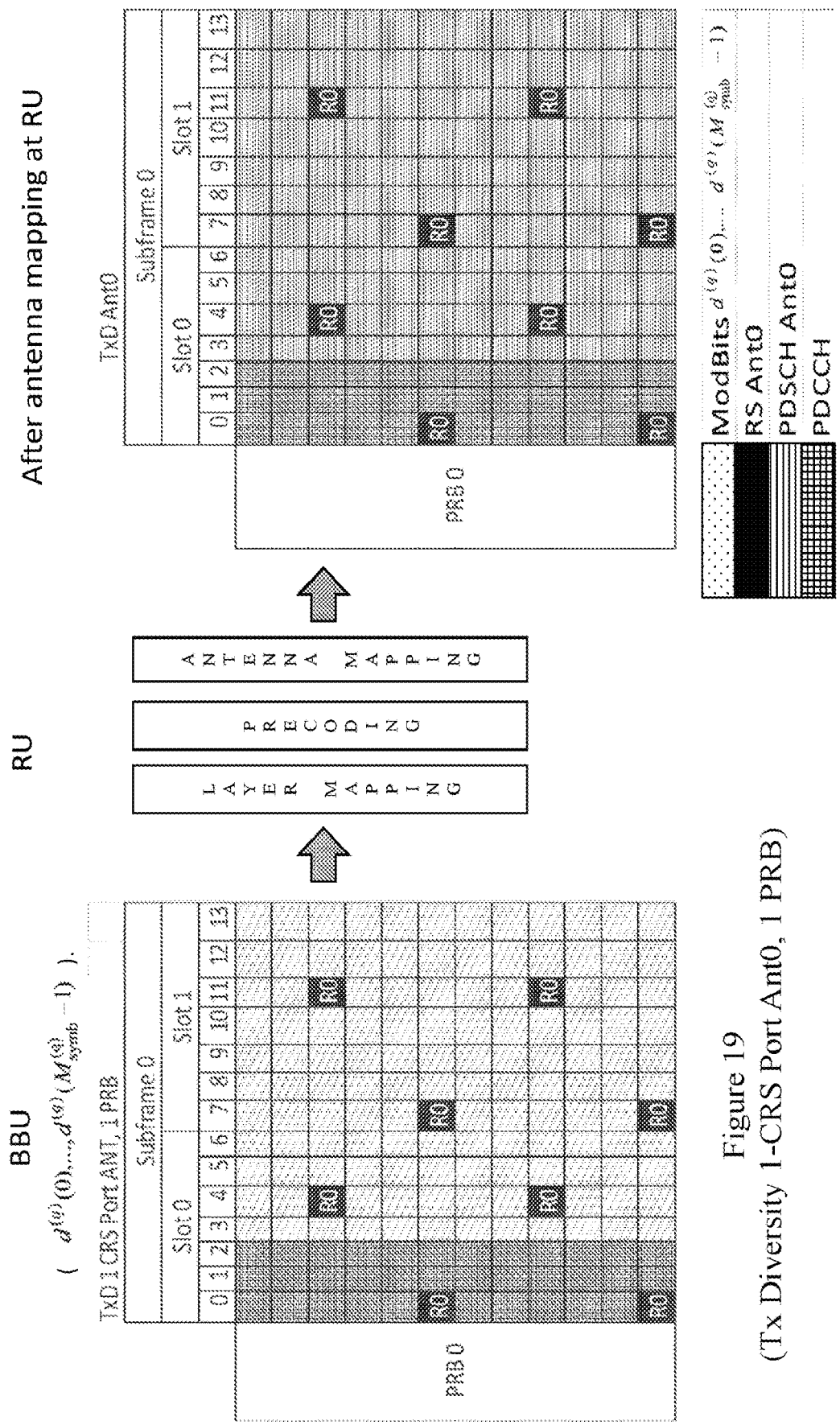
FIG. 19 illustrates an example embodiment of transmit diversity with 1-CRS Port Ant0 and 1 PRB.

Case 1 (shown in FIG. 19): Tx Diversity 1-CRS Port Ant0, 1 PRB
At DU:
For TxD case, $d^{(q)}(0), \ldots, d^{(q)}(M_{symb}^{(q)}-1)$ M_q_sym modulation bits belonging to PDSCH ANT0 are packed into a PRB. All CRS REs for ANT0 are packed into a PRB for transmission and are unpacked at the RU.
At RU:
At RU, for single antenna port TxD, single layer is used, and mapping is defined as:

$$x^{(0)}(i)=^{(0)}(i)$$

RU needs to map CRS into antenna ports.

Figure 20:
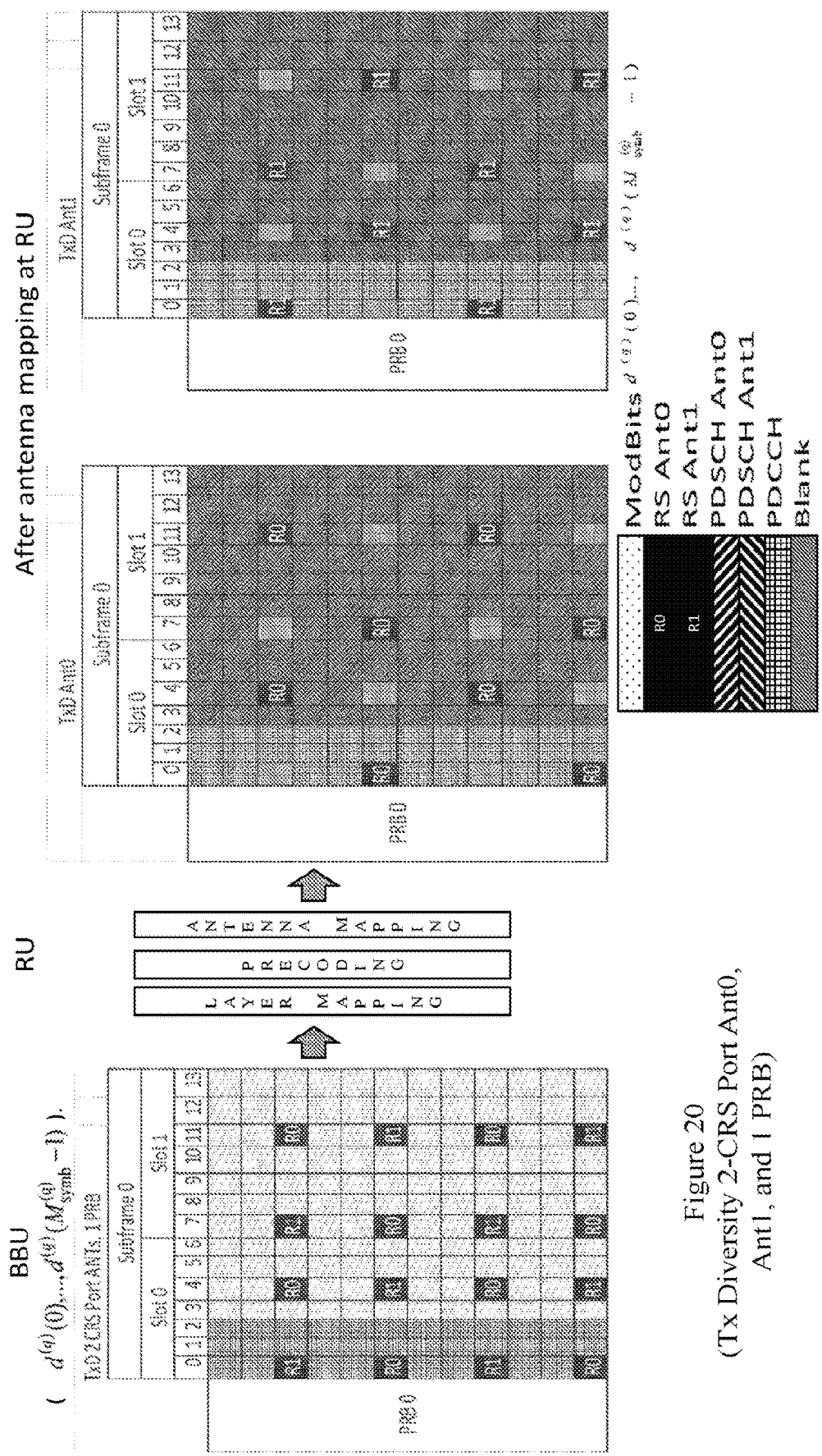
FIG. 20 illustrates an example embodiment of transmit diversity with 2-CRS Port Ant0, Ant1, and 1 PRB.

Case 2 (Shown in FIG. 20): Tx Diversity 2-CRS Port Ant0, Ant1, and 1 PRB
At DU:
For TxD case, $d^{(q)}(0), \ldots, d^{(q)}(M_{symb}^{(q)}-1)$ M_q_sym modulation bits belonging to PDSCH are packed to into a PRB. All CRS REs for ANT0, ANT1 are packed into a PRB for transmission and are unpacked at the RU.
At RU:
At RU, for two antenna port TxD, 2 layers are used, and mapping is defined as:

$$x^{(0)}(i)=d^{(0)}(2i)$$

$$x^{(1)}(i) \rightarrow d^{(0)}(2i+1)$$

For TxD, information for 2 layers are packed into a PRB for transmission and are unpacked at the RU. At RU, after layer mapping and precoding, CRS sequences for 2 antenna ports are mapped to the appropriate RE position, and the rest are left blank.

Figure 21:
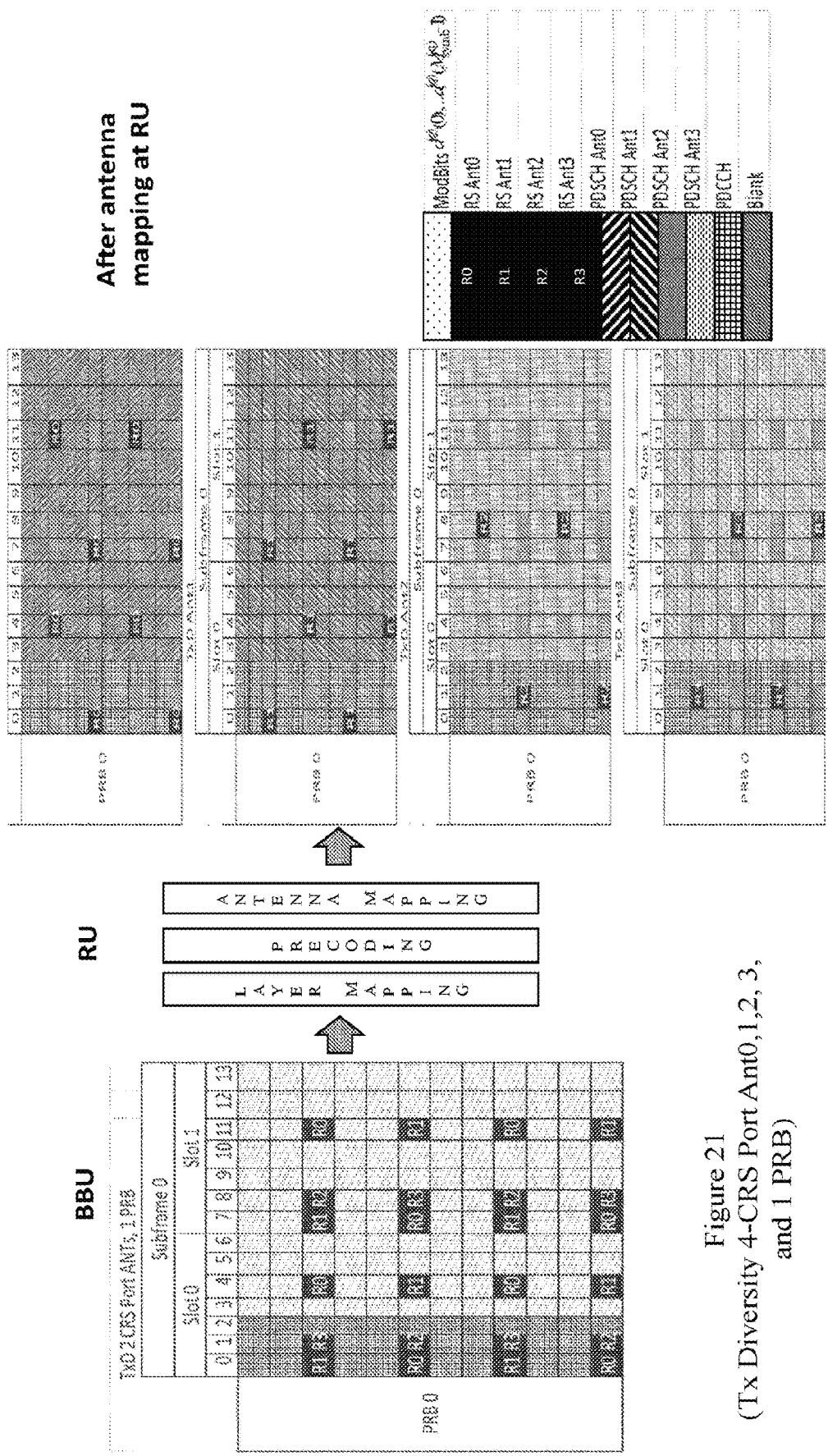
FIG. 21 illustrates an example embodiment of transmit diversity with 4-CRS Port Ant0, 1, 2, 3, and 1 PRB.

Case 3 (Shown in FIG. 21): Tx Diversity 4-CRS Port Ant0,1,2,3 and 1 PRB
At DU:
For TxD case, $d^{(q)}(0), \ldots, d^{(q)}(M_{symb}^{(q)}-1)$ M_q_sym modulation bits belonging to PDSCH are packed to into a PRB. All CRS REs for ANT0, ANT1, ANT2, ANT3 are packed into a PRB for transmission and are unpacked at the RU.
At RU:
At RU, for two antenna port TxD, 4 layers are used, and mapping is defined as:

$$x^{(0)}(i)=d^{(0)}(4i)$$

$$x^{(1)}(i)=d^{(0)}(4i+1)$$

$$x^{(2)}(i)=d^{(0)}(4i+2)$$

$$x^{(3)}(i)=d^{(0)}(4i+3)$$

For TxD, REs for 4 layers are packed into a PRB for transmission and are unpacked at the RU. At RU, after layer mapping and precoding, CRS ports for 2 antenna ports are mapped to the appropriate RE position, and the rest are left blank.

Figure 22:
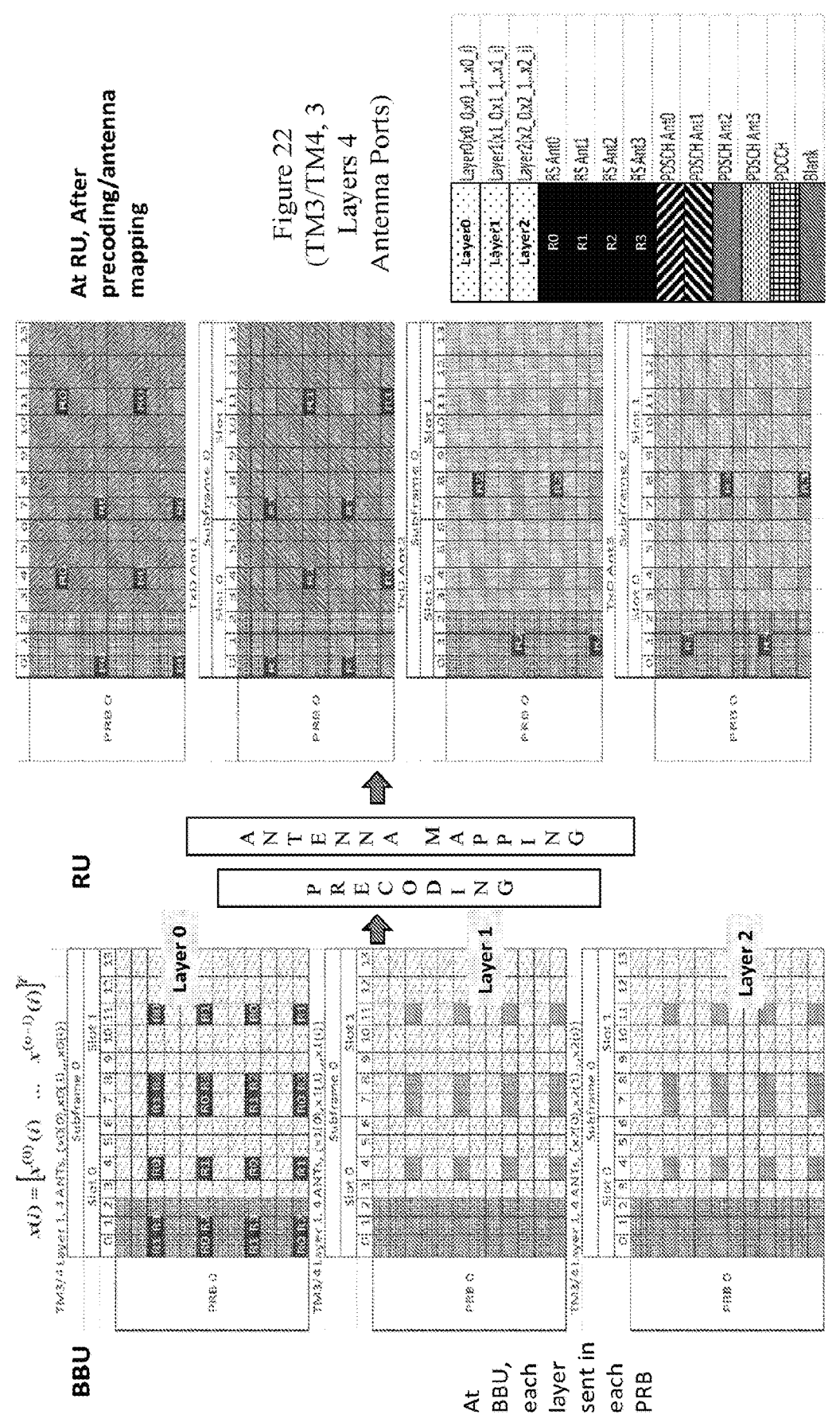

Case 4 (Shown in FIG. 22): TM3/TM4 3 Layers, 4 Antenna Ports
One symbol from each of the layers is linearly mapped to each antenna port. For TM3/TM4, REs belonging to each antenna ports are mapped to all layers at DU. At RU, layer 0 CRS is considered for CRS mapping to each antenna ports using reMask bit field, and CRS from other layer can be ignored, as shown below:

$$x^{(0)}(i)=d^{(0)}(3i)$$

$$x^{(1)}(i)=d^{(0)}(3i+1) M_{symb}^{layer}=M_{symb}^{(0)}/3$$

$$x^{(2)}(i)=d^{(0)}(3i+2)$$

Figure 23:
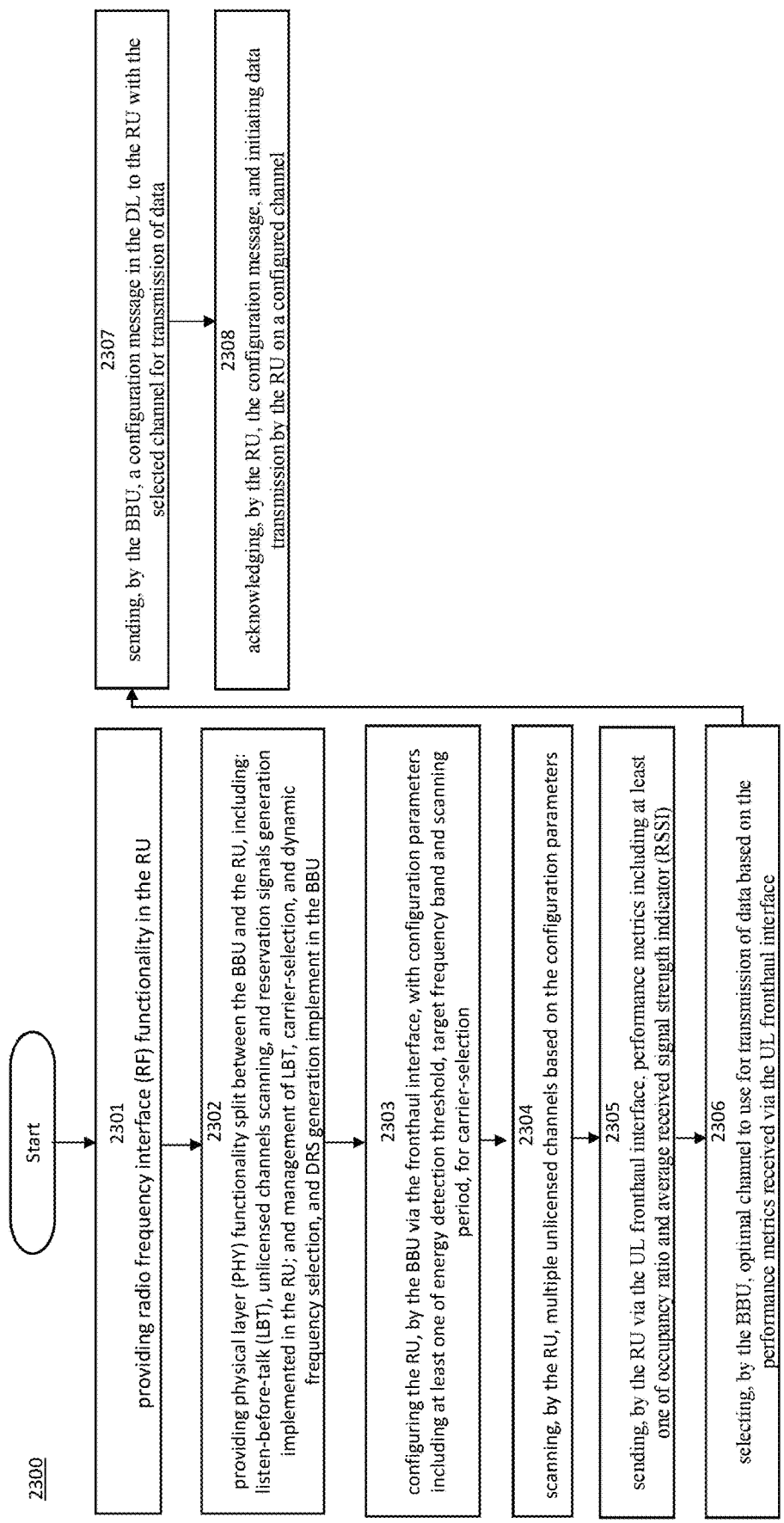
FIG. 23 is a logic flow chart of a method for LAA support in CRAN according to an example embodiment.

FIG. 23 illustrates a logic flow 2300 of an example method for providing a fronthaul interface in a cloud radio access network (CRAM) having a baseband unit (BBU) and at least one radio unit (RU) remote from the BBU, the BBU having a centralized unit (CU) and a distributed unit (DU), for unlicensed spectrum operation. Block 2301 includes providing radio frequency interface (RF) functionality in the RU. Block 2302 includes providing physical layer (PHY) functionality split between the BBU and the RU, including: listen-before-talk (LBT), unlicensed channels scanning, and reservation signals generation implemented in the RU; and management of LBT, carrier-selection, and dynamic frequency selection, and DRS generation implement in the BBU. Block 2303 includes configuring the RU, by the BBU via the fronthaul interface, with configuration parameters including at least one of energy detection threshold, target frequency band and scanning period, for carrier-selection. Block 2304 includes scanning, by the RU, multiple unlicensed channels based on the configuration parameters. Block 2305 includes sending, by the RU via the UL fronthaul interface, performance metrics including at least one of occupancy ratio and average received signal strength indicator (RSSI). Block 2306 includes selecting, by the BBU, optimal channel to use for transmission of data based on the performance metrics received via the UL fronthaul interface. Block 2307, which can be optional, includes sending, by the BBU, a configuration message in the DL to the RU with the selected channel for transmission of data. Block 2308, which can be optional, includes acknowledging, by the RU, the configuration message, and initiating data transmission by the RU on a configured channel.

Figure 24:
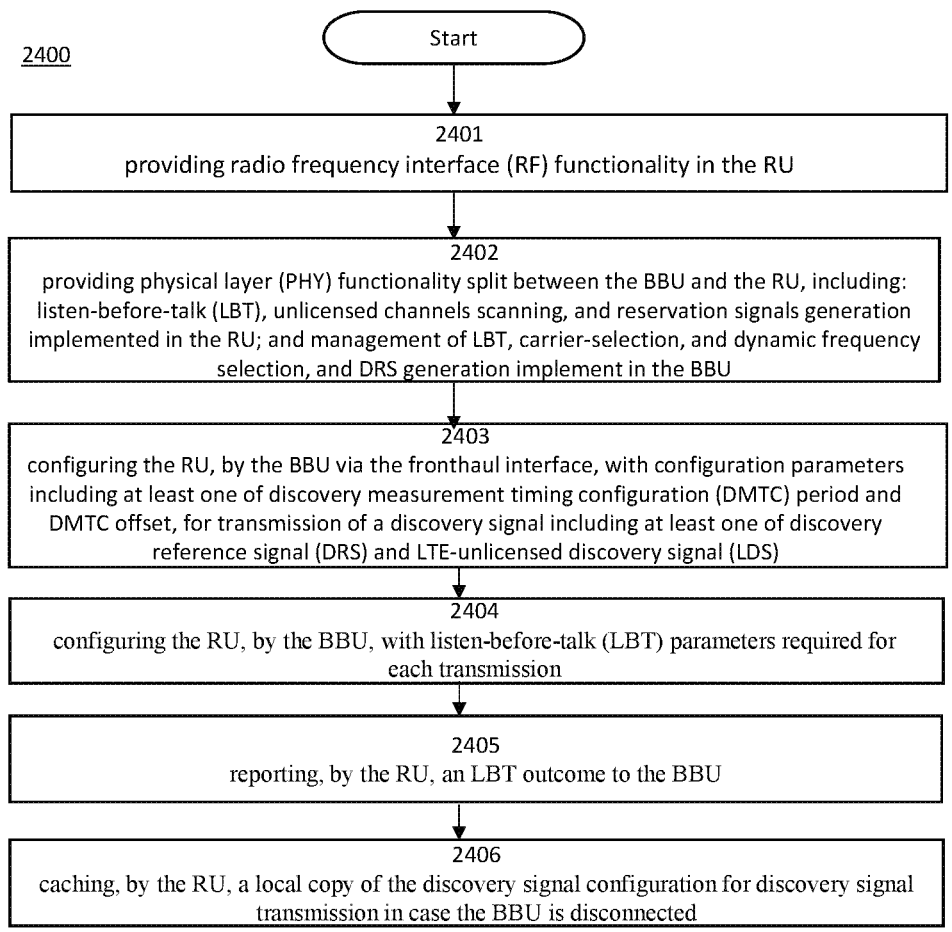
FIG. 24 is a logic flow chart of a method for LAA support in CRAN according to another exemplary embodiment.

FIG. 24 illustrates a logic flow 2400 of an example method for providing a fronthaul interface in a cloud radio access network (CRAN) having a baseband unit (BBU) and at least one radio unit (RU) remote from the BBU, the BBU having a centralized unit (CU) and a distributed unit (DU). Block 2401 includes providing radio frequency interface (RF) functionality in the RU. Block 2402 includes providing physical layer (PHY) functionality split between the BBU and the RU, including: listen-before-talk (LBT), unlicensed channels scanning, and reservation signals generation implemented in the RU; and management of LBT, carrier-selection, and dynamic frequency selection, and DRS generation implement in the BBU. Block 2403 includes configuring the RU, by the BBU via the fronthaul interface, with configuration parameters including at least one of discovery measurement timing configuration (DMTC) period and DMTC offset, for transmission of a discovery signal including at least one of discovery reference signal (DRS) and LTE-unlicensed discovery signal (LDS). Block 2404 includes configuring the RU, by the BBU, with listen-before-talk (LBT) parameters required for each transmission. Block 2405 includes reporting, by the RU, an LBT outcome to the BBU. Block 2406 includes caching, by the RU, a local copy of the discovery signal configuration for discovery signal transmission in case the BBU is disconnected.

Figure 25:
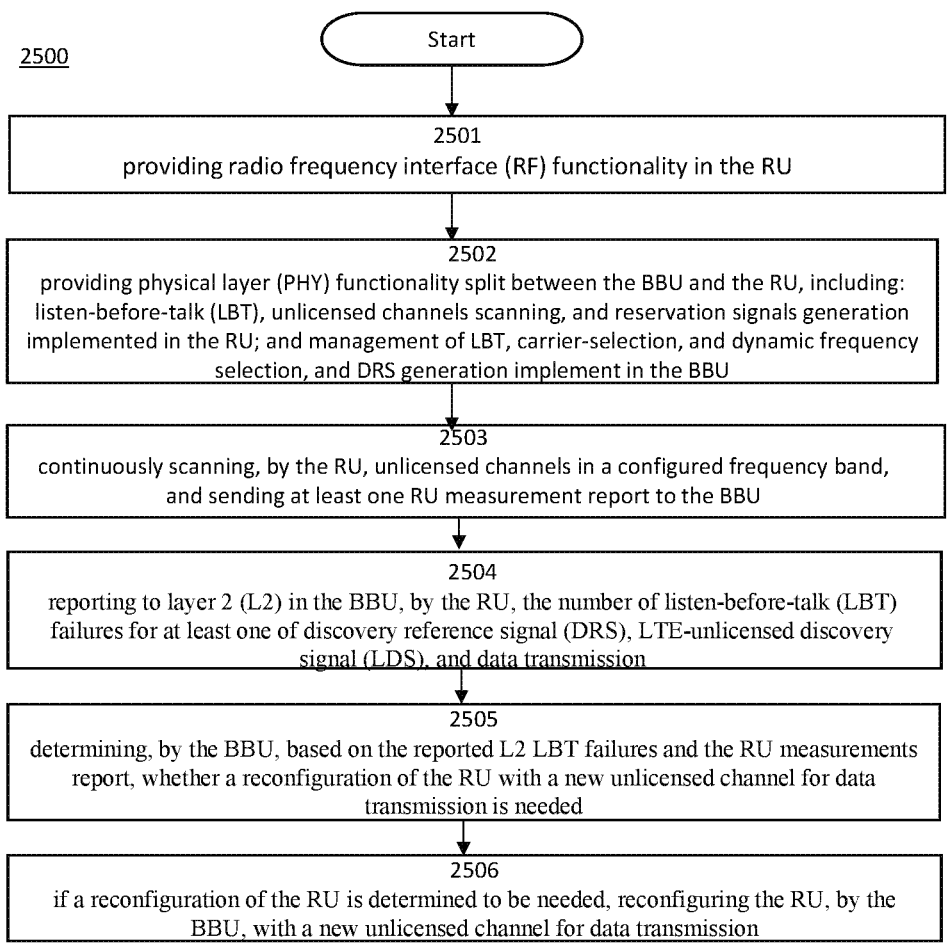
FIG. 25 is a logic flow chart of a method according to still another exemplary embodiment.

FIG. 25 illustrates a logic flow 2500 of an example method for providing a fronthaul interface in a cloud radio access network (CRAN) having a baseband unit (BBU) and at least one radio unit (RU) remote from the BBU, the BBU having a centralized unit (CU) and a distributed unit (DU). Block 2501 includes providing radio frequency interface (RF) functionality in the RU. Block 2502 includes providing physical layer (PHY) functionality split between the BBU and the RU, including: listen-before-talk (LBT), unlicensed channels scanning, and reservation signals generation implemented in the RU; and management of LBT, carrier-selection, and dynamic frequency selection, and DRS generation implement in the BBU. Block 2503 includes continuously scanning, by the RU, unlicensed channels in a configured frequency band, and sending at least one RU measurement report to the BBU. Block 2504 includes reporting to layer 2 (L2) in the BBU, by the RU, the number of listen-before-talk (LBT) failures for at least one of discovery reference signal (DRS), LTE-unlicensed discovery signal (LDS), and data transmission. Block 2505 includes determining, by the BBU, based on the reported L2 LBT failures and the RU measurements report, whether a reconfiguration of the RU with a new unlicensed channel for data transmission is needed. Block 2506 includes, if a reconfiguration of the RU is determined to be needed, reconfiguring the RU, by the BBU, with a new unlicensed channel for data transmission.

Figure 26:
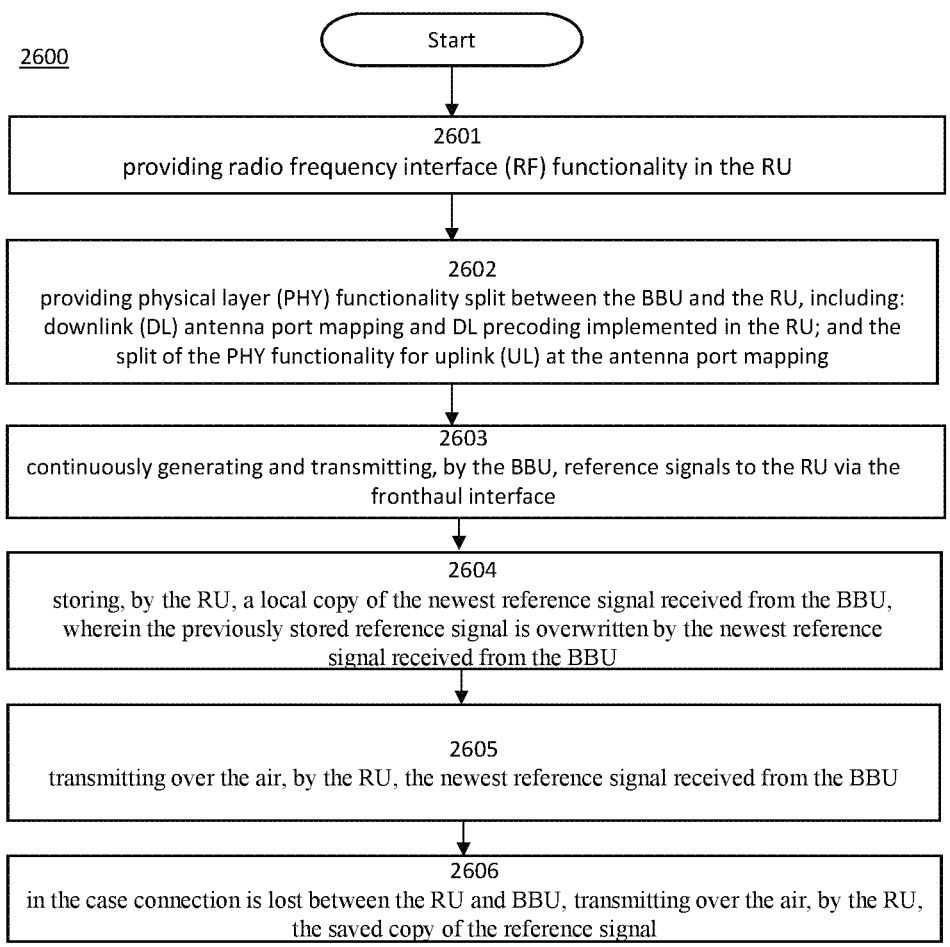
FIG. 26 is a logic flow chart of a method according to yet another exemplary embodiment.

FIG. 26 illustrates a logic flow 2600 of an example method for providing a fronthaul interface in a cloud radio access network (CRAN) having a baseband unit (BBU) and at least one radio unit (RU) remote from the BBU, the BBU having a centralized unit (CU) and a distributed unit (DU), for adapting reference signal generation and transmission in the CRAN. Block 2601 includes providing radio frequency interface (RF) functionality in the RU. Block 2602 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 2603 includes continuously generating and transmitting, by the BBU, reference signals to the RU via the fronthaul interface. Block 2604 includes storing, by the RU, a local copy of the newest reference signal received from the BBU, wherein the previously stored reference signal is overwritten by the newest reference signal received from the BBU. Block 2605 includes transmitting over the air, by the RU, the newest reference signal received from the BBU. Block 2606 includes, in the case connection is lost between the RU and BBU, transmitting over the air, by the RU, the saved copy of the reference signal.

Figure 27:
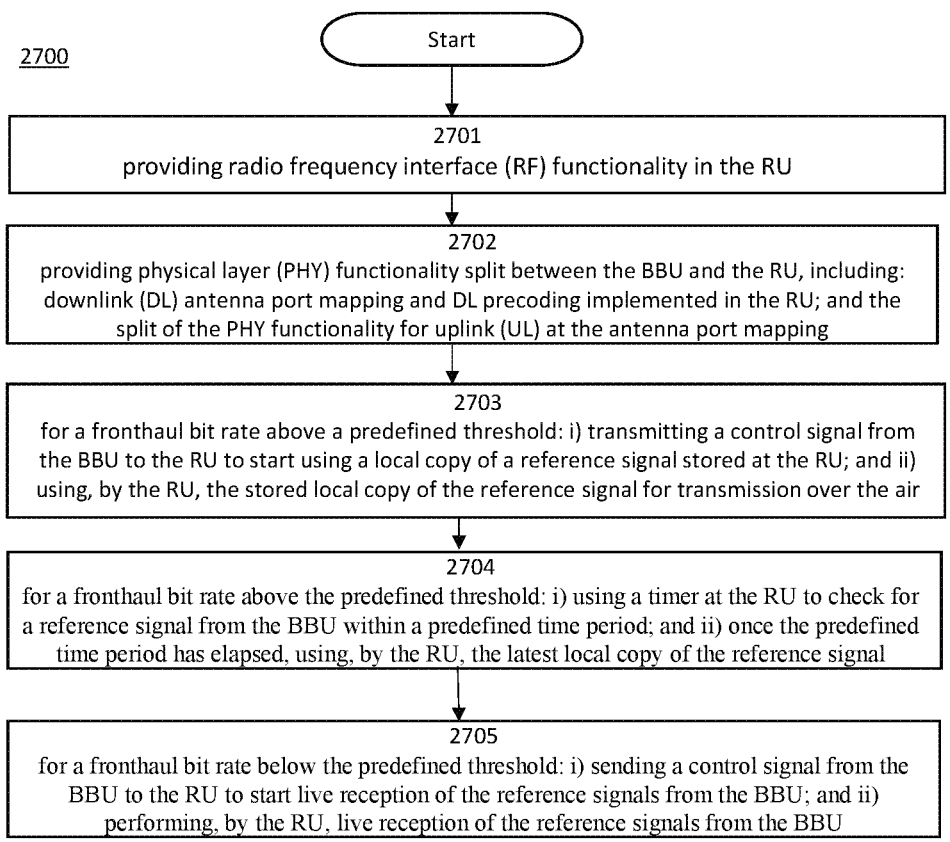
FIG. 27 is a logic flow chart of a method according to yet another exemplary embodiment.

FIG. 27 illustrates a logic flow 2700 of an example method for providing a fronthaul interface in a cloud radio access network (CRAN) having a baseband unit (BBU) and at least one radio unit (RU) remote from the BBU, the BBU having a centralized unit (CU) and a distributed unit (DU), for adapting reference signal transmission from the BBU to the RU based on fronthaul bit rate. Block 2701 includes providing radio frequency interface (RF) functionality in the RU. Block 2702 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 2703 includes, for a fronthaul bit rate above a predefined threshold: i) transmitting a control signal from the BBU to the RU to start using a local copy of a reference signal stored at the RU; and ii) using, by the RU, the stored local copy of the reference signal for transmission over the air. Block 2704 includes, for a fronthaul bit rate above the predefined threshold: i) using a timer at the RU to check for a reference signal from the BBU within a predefined time period; and ii) once the predefined time period has elapsed, using, by the RU, the latest local copy of the reference signal. Block 2705 includes, for a fronthaul bit rate below the predefined threshold: i) sending a control signal from the BBU to the RU to start live reception of the reference signals from the BBU; and ii) performing, by the RU, live reception of the reference signals from the BBU.

Figure 28:
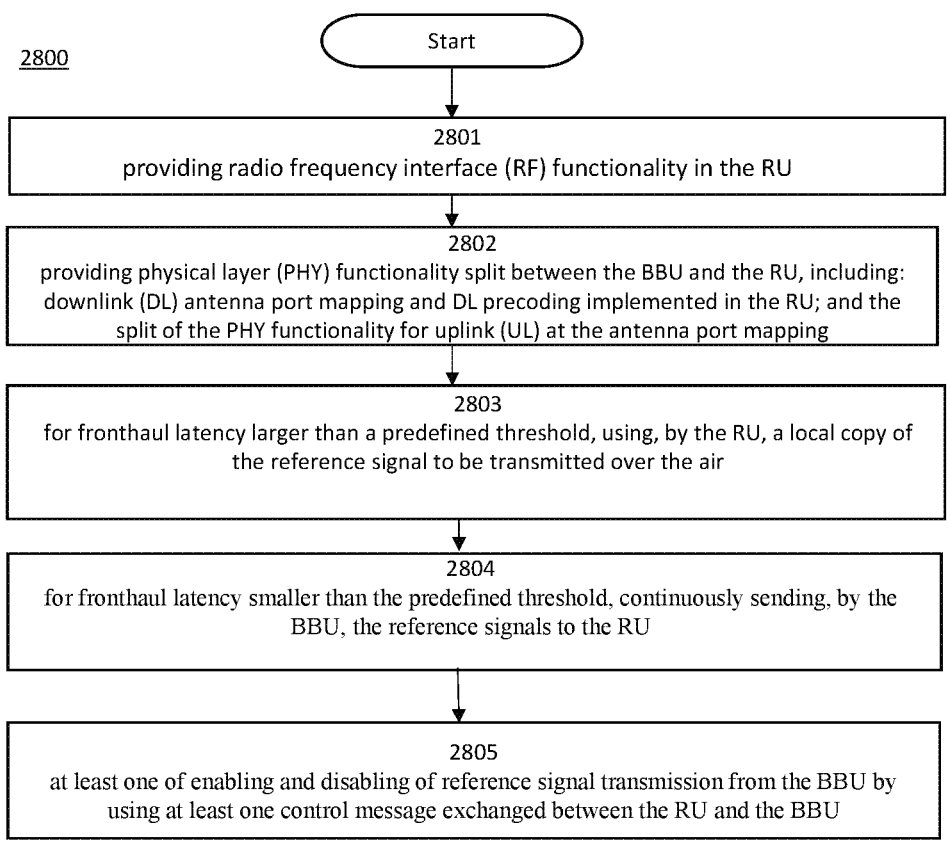
FIG. 28 is a logic flow chart of a method according to yet another exemplary embodiment.

FIG. 28 illustrates a logic flow 2800 of an example method for providing a fronthaul interface in a cloud radio access network (CRAN) having a baseband unit (BBU) and at least one radio unit (RU) remote from the BBU, the BBU having a centralized unit (CU) and a distributed unit (DU), for adapting reference signal transmission from the BBU to the RU based on fronthaul latency. Block 2801 includes providing radio frequency interface (RF) functionality in the RU. Block 2802 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 2803 includes, for fronthaul latency larger than a predefined threshold, using, by the RU, a local copy of the reference signal to be transmitted over the air. Block 2804 includes, for fronthaul latency smaller than the predefined threshold, continuously sending, by the BBU, the reference signals to the RU. Block 2805 includes at least one of enabling and disabling of reference signal transmission from the BBU by using at least one control message exchanged between the RU and the BBU.

Figure 29:
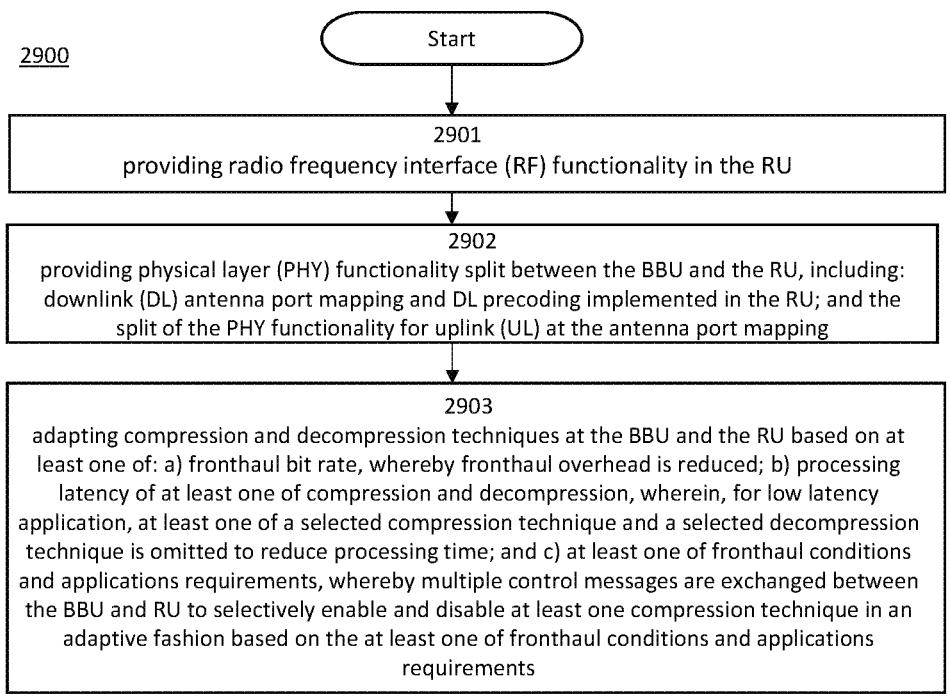
FIG. 29 is a logic flow chart of a method according to yet another exemplary embodiment.

FIG. 29 illustrates a logic flow 2900 of an example method for providing a fronthaul interface in a cloud radio access network (CRAN) having a baseband unit (BBU) and at least one radio unit (RU) remote from the BBU, the BBU having a centralized unit (CU) and a distributed unit (DU). Block 2901 includes providing radio frequency interface (RF) functionality in the RU. Block 2902 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 2903 includes adapting compression and decompression techniques at the BBU and the RU based on at least one of: a) fronthaul bit rate, whereby fronthaul overhead is reduced; b) processing latency of at least one of compression and decompression, wherein, for low latency application, at least one of a selected compression technique and a selected decompression technique is omitted to reduce processing time; and c) at least one of fronthaul conditions and applications requirements, whereby multiple control messages are exchanged between the BBU and RU to selectively enable and disable at least one compression technique in an adaptive fashion based on the at least one of fronthaul conditions and applications requirements.

Figure 30:
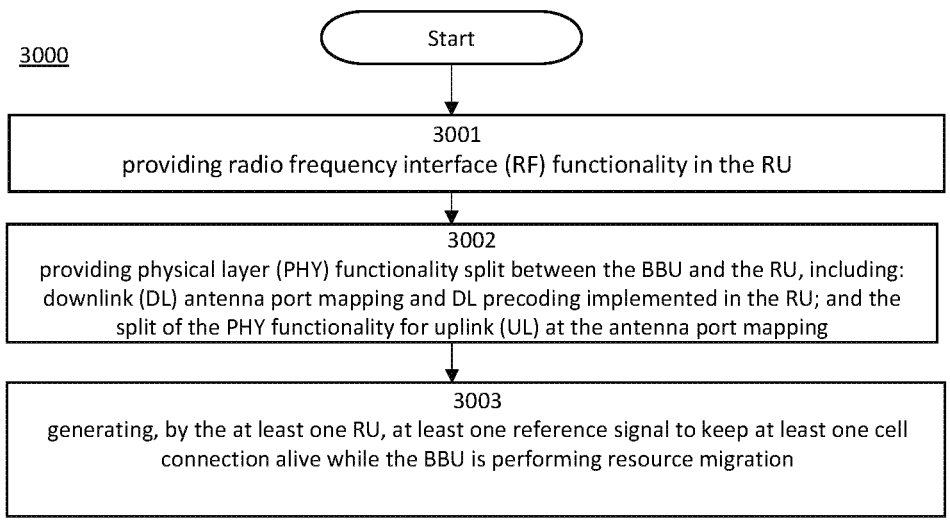
FIG. 30 is a logic flow chart of a method according to yet another exemplary embodiment.

FIG. 30 illustrates a logic flow 3000 of an example method for providing a fronthaul interface in a cloud radio access network (CRAN) having a baseband unit (BBU) and at least one radio unit (RU) remote from the BBU, the BBU having a centralized unit (CU) and a distributed unit (DU), for supporting live migration on the BBU. Block 3001 includes providing radio frequency interface (RF) functionality in the RU. Block 3002 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 3003 includes generating, by the at least one RU, at least one reference signal to keep at least one cell connection alive while the BBU is performing resource migration.

Figure 31:
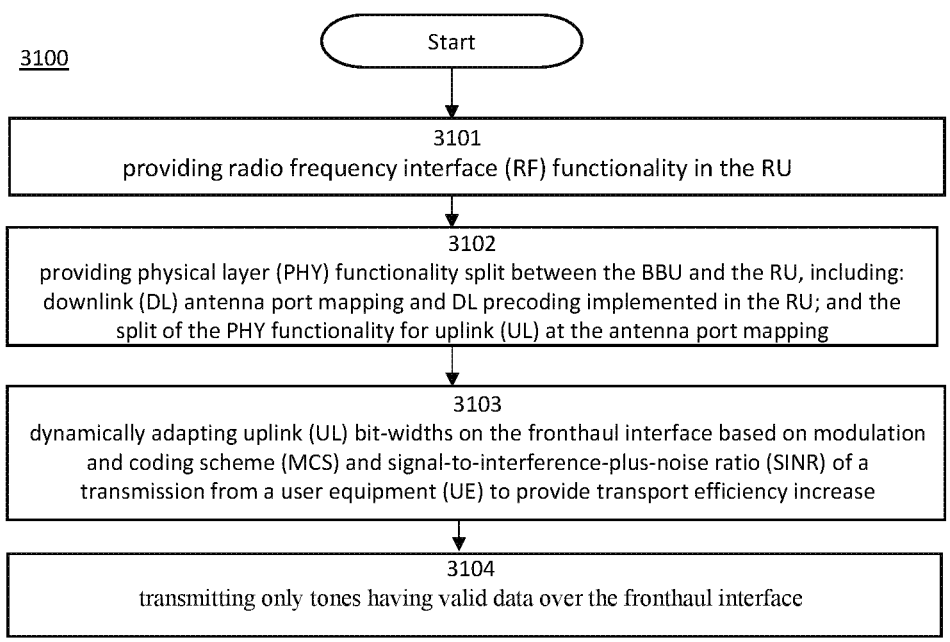
FIG. 31 is a logic flow chart of a method according to yet another exemplary embodiment.

FIG. 31 illustrates a logic flow 3100 of an example method for providing a fronthaul interface in a cloud radio access network (CRAN) having a baseband unit (BBU) and at least one radio unit (RU) remote from the BBU, the BBU having a centralized unit (CU) and a distributed unit (DU). Block 3101 includes providing radio frequency interface (RF) functionality in the RU. Block 3102 includes providing physical layer (PHY) functionality split between the BBU and the RU, including: downlink (DL) antenna port mapping and DL precoding implemented in the RU; and the split of the PHY functionality for uplink (UL) at the antenna port mapping. Block 3103 includes dynamically adapting uplink (UL) bit-widths on the fronthaul interface based on modulation and coding scheme (MCS) and signal-to-interference-plus-noise ratio (SINR) of a transmission from a user equipment (UE) to provide transport efficiency increase. Block 3104 includes transmitting only tones having valid data over the fronthaul interface.

Figure 32:
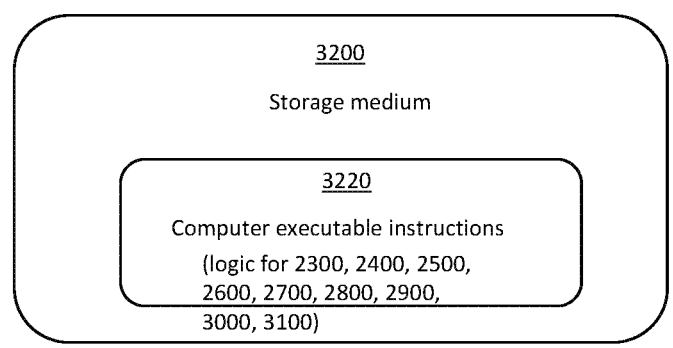
FIG. 32 is a computer-readable storage medium according to an embodiment herein.

FIG. 32 illustrates an embodiment of a storage medium 3200, which can comprise an article of manufacture, e.g., storage medium 3200 can include any non-transitory computer readable medium or machine-readable medium, such as an optical, magnetic or semiconductor storage. Storage medium 3200 can store various types of computer executable instructions, e.g., 3220. For example, storage medium 3200 can store various types of computer executable instructions to implement techniques 2300, 2400, 2500, 2600, 2700, 2800, 2900, 3000 and 3100.

Some examples of a computer readable storage medium or machine-readable storage medium can include tangible media capable of storing electronic data, e.g., volatile memory or non-volatile memory, removable or non-removable memory, erasable or non-erasable memory, writeable or re-writeable memory, and the like. Some examples of computer-executable instructions can include suitable type of code, e.g., source code, compiled code, interpreted code, executable code, static code, dynamic code, object-oriented code, visual code, and the like. The examples are not limited in this context.

The techniques and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

The terms "comprise" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles. It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges means the value, limit, and/or range +/−10%.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

Glossary of Terms

Reference is made to Third Generation Partnership Project (3GPP) system, in accordance with embodiments of the present disclosure. The present disclosure employs abbreviations, terms and technology defined in accordance with Third Generation Partnership Project (3GPP) technology standards, including the following standards and definitions. 3GPP technical specifications (TS) and technical reports (TR), which are incorporated by reference in their entirety hereby, define the related terms and architecture reference models that follow.

3GPP: Third generation partnership project
5G-NR: $5^{th}$-Generation New Radio
ARQ: automatic repeat request
HARQ: hybrid automatic repeat request
BBU: Baseband unit BPSK: Binary Phase Shift Keying
CA: Carrier aggregation
CBRS: Citizens Broadband Radio Service
CC: Component carrier
CCA: Clear channel assessment
CCE: Control Channel Element(s)
CDD: Cyclic delay diversity
CMS: Centralized Management System
CoMP: coordinated multipoint transmission
COTS: Commercial off-the-shelf
CP: cyclic prefix
CQI: channel quality indicator
CRAN: cloud radio access network
CRC: cyclic redundancy checking
CRS: Cell-specific reference signal
CSAT: Carrier-sense adaptive-transmission
CSI: Channel state information
CSI-RS: Channel state information—reference signal
CU: Central unit
BBU: Baseband unit
DAC: digital-to-analog conversion
DCI: downlink control indicator
DFS: Dynamic frequency selection
DM-RS: Demodulation—reference signal
DRS: Discovery Reference Signals
DMTC: discovery measurement timing configuration
DL: downlink
DU: Distributed unit
EPC: Evolved Packet Core
E-UTRA: Evolved Universal Terrestrial Radio Access
eNodeB/eNB: Evolved Node B
FDD: Frequency-division duplex
FEC: forward error correction
FFT: Fast Fourier Transform
GbE: Gigabit Ethernet
iFFT: inverse Fast Fourier Transform
ISM radio bands: industrial, scientific and medical radio bands
HARQ: hybrid automatic repeat request
HARQI: hybrid automatic repeat request information
IoT: Internet of things
IQ compression: in-phase/Quadrature samples compression
IQ decompression: in-phase/Quadrature samples decompression
JP: joint processing
JR: joint reception
KPI: key performance indicator
L1: Layer 1 of the protocol stack or the physical layer
L2: Layer 2 of the protocol stack which includes the MAC, scheduler, RLC, and PDCP
L3: Layer 3 of the protocol stack or the RRC layer
LAA: licensed-assisted access
LBT: Listen-before talk
LCM: life cycle management
LDS: LTE-U discovery signal
LTE: long term evolution
LTE-A: LTE Advanced
LTE-U: LTE-unlicensed
MAC: Media Access Control
MBSFN: Multicast-broadcast single-frequency network
MCS: modulation and coding scheme
MIB: Master Information Block
MIMO: multiple input, multiple output
MMSE-IRC: Minimum mean square error—interference rejection combining
MMSE-MRC: Minimum mean square error—maximum-ratio combining
mmWave: millimeter wave
MNO: Mobile network operator
NetConf: network configuration protocol
NR: New radio
OAM: Operation and management
OFDM: orthogonal frequency division multiplexing
OSS: operator service system
PBCH: Physical Broadcast Channel
PCFICH: Physical Control Format Indicator Channel
PCI: physical cell ID
PDCCH: Physical downlink Control Channel
PDCP: Packet Data Convergence Protocol
PDSCH: physical downlink shared channel
PHICH: Physical Hybrid ARQ Indicator Channel
PHY: physical layer
LPHY: lower physical layer
HPHY: higher physical layer (synonymous with upper physical layer)
UPHY: upper physical layer (synonymous with higher physical layer)
PNF: Physical Network Function
PRB: physical resource block
P-SS: Primary Synchronization Signal
PUCCH: Physical Uplink Control Channel
PUSCH: Physical Uplink Shared Channel
QAM: quadrature amplitude modulation
QPSK: Quadrature Phase Shift Keying
RACH: random access channel
PRACH: physical random access channel
RE: resource element
REST API: Representational State Transfer Application Programming Interface
RF: radio frequency interface
RI: rank indicator
RLC: Radio Link Control
RRC: Radio Resource Control
RRH: Remote Radio Head
RRM: Radio resource management
RRU: Remote radio unit
RU: Radio unit
RS: reference signal
RSSI: received signal strength indicator
SCell: Secondary cell
SDAP: Service Data Adaptation Protocol
SIMO: single input, multiple output
SINR: signal-to-interference-plus-noise ratio
SM: Spatial multiplexing
SM LD CDD: Spatial multiplexing large delay cyclic delay diversity
SM No CDD: Spatial multiplexing No cyclic delay diversity
SON: Self-Organizing Network
SRS: Sounding reference signal
SSS: Secondary Synchronization Signal
TB: transport block
TDD: Time division duplex
TM: transmission mode
TPC: Transmission power control
TRP: Transmit Receive Point
TTI: Transmission Time Interval
Tx: Transmitter
TxD: Transmit diversity
TXOP SFN/SN: Transmit opportunity system frame number/subframe number UCI: Uplink Control Information
UE: user equipment
UL: uplink
UL DMRS: uplink demodulation reference signal
ULSCH: Uplink Shared Channel
UNII radio band: Unlicensed National Information Infrastructure radio band
vBBU: Virtualized baseband unit
VNF: Virtual Network Function

The invention claimed is:

1. A cloud radio access network (CRAN) system, comprising:
a baseband unit (BBU) having a centralized unit (CU) and a distributed unit (DU), wherein the CU and the DU are one of i) co-located and ii) not co-located; and
a radio unit (RU) remote from the BBU;
wherein fronthaul interface between the RU and the BBU comprises:
radio frequency interface (RF) functionality implemented in the RU; and
implementation of asymmetric split for downlink and uplink at physical layer (PHY) functionality split between the BBU and RU, including:
downlink (DL) antenna port mapping and DL precoding which are implemented in the RU; and
uplink (UL) antenna port mapping is implemented in the BBU.

2. The CRAN system of claim 1, wherein for the downlink, precoding and resource element (RE) mapping to time and frequency resources is implemented in BBU, and RE mapping for antenna ports is implemented in the RU.

3. The CRAN system of claim 1, wherein, during precoding, cell-specific reference signals (CRS) is logically separated from physical downlink shared channel (PDSCH) resources in a physical resource block (PRB).

4. The CRAN system of claim 1, wherein a specific precoding type is indicated to the RU, the specific precoding type being defined by at least one of a codebook index, number of layers and a type of transmission scheme.

5. The CRAN system of claim 4, wherein the type of transmission scheme includes at least one of spatial multiplexing, cyclic delay diversity (CDD), spatial multiplexing without CDD, and transmit diversity.

6. The CRAN system of claim 1, wherein, for efficient transmission on the fronthaul interface, resource elements for cell-specific reference signals (CRS) from multiple antennas are multiplexed within a data transmission for a single physical resource block (PRB) in the case number of layers is less than number of transmit antennas.

7. The CRAN system of claim 6, further comprising:
using at least one of CRS symbol number (CRSSymNum), shift, layer identification (ID), and a mask to separate the CRS for multiple antennas in the RU.

8. A method of providing a fronthaul interface in a cloud radio access network (CRAN) having a baseband unit (BBU) and at least one radio unit (RU) remote from the BBU, the BBU having a centralized unit (CU) and a distributed unit (DU), the method comprising:
providing radio frequency interface (RF) functionality in the RU; and
providing physical layer (PHY) functionality split between the BBU and the RU, including:
downlink (DL) antenna port mapping and DL precoding implemented in the RU; and
the split of the PHY functionality for uplink (UL) at the antenna port mapping.

9. The method of claim 8, further comprising:
dynamically adapting uplink (UL) bit-widths on the fronthaul interface based on modulation and coding scheme (MCS) and signal-to-interference-plus-noise ratio (SINK) of a transmission from a user equipment (UE) to provide transport efficiency increase; and
transmitting only tones having valid data over the fronthaul interface.

10. The method of claim 8, wherein the method is for adapting reference signal generation and transmission in the CRAN, the method further comprising:
a. continuously generating and transmitting, by the BBU, reference signals to the RU via the fronthaul interface;
b. storing, by the RU, a local copy of the newest reference signal received from the BBU, wherein the previously stored reference signal is overwritten by the newest reference signal received from the BBU;
c. transmitting over the air, by the RU, the newest reference signal received from the BBU; and
d. in the case connection is lost between the RU and BBU, transmitting over the air, by the RU, the saved copy of the reference signal.

11. The method of claim 8, wherein the method is for adapting reference signal transmission from the BBU to the RU based on fronthaul bit rate, the method further comprising at least one of:
a) for a fronthaul bit rate above a predefined threshold:
i. transmitting a control signal from the BBU to the RU to start using a local copy of a reference signal stored at the RU; and
ii. using, by the RU, the stored local copy of the reference signal for transmission over the air;
b) for a fronthaul bit rate above the predefined threshold:
i. using a timer at the RU to check for a reference signal from the BBU within a predefined time period; and
ii. once the predefined time period has elapsed, using, by the RU, the latest local copy of the reference signal; and
c) for a fronthaul bit rate below the predefined threshold:
i. sending a control signal from the BBU to the RU to start live reception of the reference signals from the BBU; and
ii. performing, by the RU, live reception of the reference signals from the BBU.

12. The method of claim 8, wherein the method is for adapting reference signal transmission from the BBU to the RU based on fronthaul latency, the method further comprising:
a. for fronthaul latency larger than a predefined threshold, using, by the RU, a local copy of the reference signal to be transmitted over the air;
b. for fronthaul latency smaller than the predefined threshold, continuously sending, by the BBU, the reference signals to the RU; and
c. at least one of enabling and disabling of reference signal transmission from the BBU by using at least one control message exchanged between the RU and the BBU.

13. The method of claim 8, wherein the method is for adapting compression and decompression techniques at the BBU and the RU based on at least one of:
a. fronthaul bit rate, whereby fronthaul overhead is reduced;
b. processing latency of at least one of compression and decompression, wherein, for low latency application, at least one of a selected compression technique and a selected decompression technique is omitted to reduce processing time; and c. at least one of fronthaul conditions and applications requirements, whereby multiple control messages are exchanged between the BBU and RU to selectively enable and disable at least one compression technique in an adaptive fashion based on the at least one of fronthaul conditions and applications requirements.

14. The method of claim 8, wherein the method is for supporting live migration on the BBU, the method further comprising:

generating, by the at least one RU, at least one reference signal to keep at least one cell connection alive while the BBU is performing resource migration.

15. A method of providing a fronthaul interface in a cloud radio access network (CRAN) having a baseband unit (BBU) and at least one radio unit (RU) remote from the BBU, the BBU having a centralized unit (CU) and a distributed unit (DU), the method comprising:

providing radio frequency interface (RF) functionality in the RU; and providing physical layer (PHY) functionality split between the BBU and the RU, including:

listen-before-talk (LBT), unlicensed channels scanning, and reservation signals generation implemented in the RU; and management of LBT, carrier-selection, and dynamic frequency selection, and DRS generation implement in the BBU.

16. The method of claim 15, for unlicensed spectrum operation, further comprising:

a. configuring the RU, by the BBU via the fronthaul interface, with configuration parameters including at least one of energy detection threshold, target frequency band and scanning period, for carrier-selection;

b. scanning, by the RU, multiple unlicensed channels based on the configuration parameters;

c. sending, by the RU via the UL fronthaul interface, performance metrics including at least one of occupancy ratio and average received signal strength indicator (RSSI); and d. selecting, by the BBU, optimal channel to use for transmission of data based on the performance metrics received via the UL fronthaul interface.

17. The method of claim 16, further comprising:

e. sending, by the BBU, a configuration message in the DL to the RU with the selected channel for transmission of data; and f. acknowledging, by the RU, the configuration message, and initiating data transmission by the RU on a configured channel.

18. The method of claim 15, further comprising:

a. configuring the RU, by the BBU via the fronthaul interface, with configuration parameters including at least one of discovery measurement timing configuration (DMTC) period and DMTC offset, for transmission of a discovery signal including at least one of discovery reference signal (DRS) and LTE-unlicensed discovery signal (LDS);

b. configuring the RU, by the BBU, with listen-before-talk (LBT) parameters required for each transmission;

c. reporting, by the RU, an LBT outcome to the BBU; and d. caching, by the RU, a local copy of the discovery signal configuration for discovery signal transmission in case the BBU is disconnected.

19. The method of claim 15, further comprising:

a. continuously scanning, by the RU, unlicensed channels in a configured frequency band, and sending at least one RU measurement report to the BBU;

b. reporting to layer 2 (L2) in the BBU, by the RU, the number of listen-before-talk (LBT) failures for at least one of discovery reference signal (DRS), LTE-unlicensed discovery signal (LDS), and data transmission;

c. determining, by the BBU, based on the reported L2 LBT failures and the RU measurements report, whether a reconfiguration of the RU with a new unlicensed channel for data transmission is needed; and d. if a reconfiguration of the RU is determined to be needed, reconfiguring the RU, by the BBU, with a new unlicensed channel for data transmission.

20. An apparatus for configuring at least one distributed unit (DU) of a baseband unit (BBU) in a cloud radio access network (CRAN), the CRAN additionally having at least one radio unit (RU) remote from the BBU, the BBU having the at least one DU and a centralized unit (CU), comprising:

a fronthaul interface between the BBU and the DU for data transfer;

a network configuration protocol (NetConf) interface for alarms, events, key performance indicators (KPIs) and configuration of the DU; and a representational state transfer application programming interface (REST API) for lifecycle management of the DU.

* * * * *